US010095456B2

(12) United States Patent
Park et al.

(10) Patent No.: US 10,095,456 B2
(45) Date of Patent: Oct. 9, 2018

(54) DISPLAY APPARATUS FOR EXTRACTING BACKGROUND AND IMAGE DATA AND METHOD OF DRIVING THE SAME

(71) Applicant: SAMSUNG DISPLAY CO., LTD., Yongin-si, Gyeonggi-Do (KR)

(72) Inventors: Se-Ki Park, Hwaseong-si (KR); Yong-Hoon Kwon, Hwaseong-si (KR); Byoung-Dae Ye, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 61 days.

(21) Appl. No.: 14/992,666

(22) Filed: Jan. 11, 2016

(65) Prior Publication Data
US 2016/0379544 A1 Dec. 29, 2016

(30) Foreign Application Priority Data
Jun. 24, 2015 (KR) .......................... 10-2015-0089995

(51) Int. Cl.
*G06F 3/038* (2013.01)
*G09G 5/00* (2006.01)
*G06F 3/14* (2006.01)
*G09G 5/377* (2006.01)
*G09G 3/36* (2006.01)
G09G 3/34 (2006.01)

(52) U.S. Cl.
CPC ......... *G06F 3/1423* (2013.01); *G09G 3/3648* (2013.01); *G09G 5/377* (2013.01); *G09G 3/342* (2013.01); *G09G 2300/023* (2013.01); *G09G 2340/10* (2013.01); *G09G 2340/12* (2013.01)

(58) Field of Classification Search
CPC ..................................... G09G 3/2092
USPC ................................. 345/207, 694
See application file for complete search history.

(56) References Cited

U.S. PATENT DOCUMENTS

2009/0009455 A1*  1/2009  Kimura ............... G09G 3/2074
345/89
2010/0118002 A1*  5/2010  Yamashita ........... G09G 3/3233
345/205

(Continued)

FOREIGN PATENT DOCUMENTS

| KR | 1020090075234 | 7/2009 |
|---|---|---|
| KR | 1020140028558 | 3/2014 |
| KR | 1020140090888 | 7/2014 |

*Primary Examiner* — Long D Pham
(74) *Attorney, Agent, or Firm* — F. Chau & Associates, LLC

(57) ABSTRACT

A display apparatus includes an image sensor, a display panel, a timing controller, and a data driver. The image sensor senses a background image and generates background image data based on the background image. The display panel includes a first group of pixels disposed on a first area of the display panel and a second group of pixels disposed on a second area of the display panel. The timing controller extracts partial image data corresponding to the first area from input image data and partial background image data corresponding to the second area from the first background image data. The data driver generates first data voltages based on the partial image data, generates second data voltages based on the partial background image data, to output the first data voltages to the first group of pixels, and to output the second data voltages to the second group of pixels.

17 Claims, 21 Drawing Sheets

(56) References Cited

U.S. PATENT DOCUMENTS

| | | | |
|---|---|---|---|
| 2010/0265228 A1* | 10/2010 | Kimura | G09G 3/3233 345/207 |
| 2012/0249617 A1* | 10/2012 | Ikawa | H04N 5/58 345/691 |
| 2013/0147777 A1* | 6/2013 | Lau | G02B 26/00 345/207 |
| 2014/0333541 A1 | 11/2014 | Lee et al. | |
| 2016/0104302 A1* | 4/2016 | Lee | G09G 5/02 345/592 |

* cited by examiner

DISPLAY APPARATUS FOR EXTRACTING BACKGROUND AND IMAGE DATA AND METHOD OF DRIVING THE SAME

CROSS-REFERENCE TO RELATED APPLICATION

This application claims priority under 35 U.S.C. § 119 to Korean Patent Application No. 10-2015-0089995, filed on Jun. 24, 2015, in the Korean Intellectual Property Office (KIPO), the disclosure of which is incorporated by reference herein in its entirety.

TECHNICAL FIELD

Exemplary embodiments of the present inventive concept relate to a display device, and more particularly, to a display apparatus and a method of driving the display apparatus.

DISCUSSION OF THE RELATED ART

Recent studies have been directed to a transparent display apparatus capable of displaying an input image simultaneously with a background image. Such a transparent display apparatus may be a self-emissive transparent display device or a non-self-emissive transparent display device. The self-emissive transparent display device does not require a separate light source, and the non-self-emissive transparent display device does require a separate light source.

SUMMARY

According to an exemplary embodiment of the present inventive concept, a display apparatus is provided. The display apparatus includes a first image sensor, a first display panel, a first timing controller, and a data driver. The first image sensor is configured to sense a first background image, and to generate first background image data based on the first background image. The first display panel includes a plurality of first pixels arranged in a first matrix. The plurality of first pixels includes a first group of pixels disposed on a first area of the first display panel and a second group of pixels disposed on a second area of the first display panel. The first timing controller is configured to extract first partial image data corresponding to the first area from input image data, and to extract first partial background image data corresponding to the second area from the first background image data. The data driver is configured to generate first data voltages based on the first partial image data, to generate second data voltages based on the first partial background image data, to output the first data voltages to the first group of pixels, and to output the second data voltages to the second group of pixels.

The first display panel may be configured to display a first image. The first display panel may be disposed on a first surface of the display apparatus. The first image may correspond to a composite image of the first partial image data and the first partial background image data. The first image sensor may be mounted on a second surface of the display apparatus opposite to the first surface of the display apparatus.

Each of the first group of pixels may be disposed on one of a first group of columns of the first matrix, and each of the second group of pixels may be disposed on one of a second group of columns. The first group of columns and the second group of columns may be alternately arranged.

Each of the first group of pixels may be disposed on one of a first group of rows of the first matrix, and each of the second group of pixels is disposed on one of a second group of rows. The first group of rows and the second group of rows may be alternately arranged.

A resolution of the input image data may be higher than a resolution of the first background image data, and a number of pixels of the first group of pixels may be greater than a number of pixels of the second group of pixels.

The resolution of the input image data may be n times higher than the resolution of the first background image data, where n may be a natural number equal to or greater than two, and the number of the pixels of the first group of pixels may be m times greater than the number of the pixels of the second group of pixels, where m may be a natural number smaller than n.

The first pixel, the second pixel, the third pixel, and the fourth pixel may be arranged in an i×j matrix of the first matrix (i and j are natural numbers greater than one). The first group of pixels may include the first pixel, the second pixel, and the third pixel, and the second group of pixels may include the fourth pixel.

A resolution of the input image data may be higher than a resolution of the first background image data. A number of pixels of the first group of pixels may be substantially the same as a number of pixels of the second group of pixels.

The display apparatus may further include a second image sensor. The second image sensor may be configured to sense a second background image different from the first background image.

The second image sensor may be configured to detect a viewpoint of a viewer. The first partial background image data may correspond to the viewpoint of the viewer.

The second image sensor may be configured to generate second background image data based on the second background image. The display apparatus may further include a second display panel, a second timing controller, and a second data driver. The second display panel may include a plurality of second pixels arranged in a second matrix. The plurality of second pixels may include a third group of pixels disposed on a third area of the second display panel and a fourth group of pixels disposed on a fourth area of the second display panel. The second timing controller may be configured to extract second partial image data corresponding to the third area from the input image data, and to extract second partial background image data corresponding to the fourth area from the second background image data. The second data driver may be configured to generate third data voltages based on the second partial image data, to generate fourth data voltages based on the second partial background image data, to output the third data voltages to the third group of pixels, and to output the fourth data voltages to the fourth group of pixels.

The second display panel may be configured to display a second image. The second display panel may be disposed on a second surface of the display apparatus. The second image may correspond to a composite image of the second partial image data and the second partial background image data. The second image sensor may be mounted on a first surface of the display apparatus opposite to the second surface of the display apparatus.

According to an exemplary embodiment of the present inventive concept, a method of driving a display apparatus including a first display panel is provided. The method includes receiving input image data, sensing, using a first image sensor, a first background image, generating first background image data based on the first background image, extracting first partial image data from the input image data, extracting first partial background image data from the first background image data, generating first data voltages based on the first partial image data, outputting the first data voltages to a first group of pixels of the first display panel, generating second data voltages based on the first partial background image data, and outputting the second data voltages to a second group of pixels of the first display panel. The first partial image data corresponds to a first area of the first display panel. The first partial background image data corresponds to a second area of the first display panel. The first group of pixels is disposed on the first area. The second group of pixels is disposed on the second area.

The first display panel may be configured to display a first image. The first display panel may be disposed on a first surface of the display apparatus. The first image may correspond to a composite image of the first partial image data and the first partial background image data. The first image sensor may be mounted on a second surface of the display apparatus opposite to the first surface of the display apparatus.

The first group of pixels and the second group of pixels may be arranged in a matrix. Each of the first group of pixels may be disposed on one of a first group of columns of the matrix, and each of the second group of pixels may be disposed on one of a second group of columns of the matrix. The first group of columns and the second group of columns may be alternately arranged.

The first group of pixels and the second group of pixels may be arranged in a matrix. Each of the first group of pixels may be disposed on one of a first group of rows of the matrix, and each of the second group of pixels may be disposed on one of a second group of rows. The first group of rows and the second group of rows may be alternately arranged.

A resolution of the input image data may be higher than a resolution of the first background image data. A number of pixels of the first group of pixels may be greater than a number of pixels of the second group of pixels.

The display apparatus may further include a second display panel. The method may further include sensing, using a second image sensor, a second background image, generating second background image data based on the second background image, extracting second partial image data from the input image data, extracting second partial background image data from the second background image data, generating third data voltages based on the second partial image data, outputting the third data voltages to a third group of pixels of the second display panel, generating fourth data voltages based on the second partial background image data, and outputting the fourth data voltages to a fourth group of pixels of the second display panel. The second partial image data may correspond to a third area of the second display panel. The second partial background image data may correspond to a fourth area of the second display panel. The third group of pixels may be disposed on the third area. The fourth group of pixels may be disposed on the fourth area.

The second display panel may be configured to display a second image. The second display panel may be disposed on a second surface of the display apparatus. The second image may correspond to a composite image of the second partial image data and the second partial background image data. The second image sensor may be mounted on a first surface of the display apparatus opposite to the second surface of the display apparatus.

According to an exemplary embodiment of the present inventive concept, a display apparatus is provided. The display apparatus includes a first display panel, a second display panel, a first image sensor, a second image sensor, a first backlight unit, and a second backlight unit. The first display panel displays a first image. The first display panel is disposed on a first surface of the display apparatus. The second display panel displays a second image. The second display panel is disposed on a second surface of the display apparatus opposite to the first surface. The first image sensor senses a first background image around the display apparatus and generates first background image data based on the first background image. The first image sensor is disposed on the second surface of the display apparatus. The second image sensor senses a second background image around the display apparatus and generates second background image data based on the second background image. The second image sensor is disposed on the first surface of the display apparatus. The first backlight unit supplies light to the first display panel. The second backlight unit supplies light to the second display panel. Each of the first and second backlight units is disposed between the first display panel and the second display panel.

BRIEF DESCRIPTION OF THE DRAWINGS

The above and other features and aspects of the present inventive concept will become more apparent by describing in detailed exemplary embodiments thereof with reference to the accompanying drawings, in which.

DETAILED DESCRIPTION OF THE EMBODIMENTS

Figure 1A:
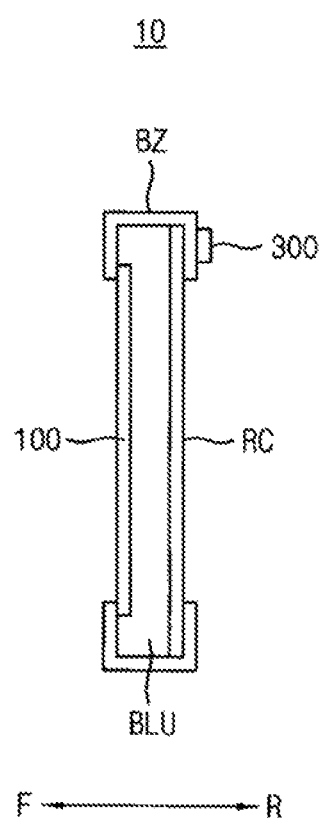
FIG. 1A is a cross-sectional diagram illustrating a side view of a display apparatus according to an exemplary embodiment of the present inventive concept.

Hereinafter, the present inventive concept will be described in detail with reference to the accompanying drawings.

In the drawings, the size and relative sizes of layers and regions may be exaggerated for clarity. Like reference numbers may refer to like elements throughout the specification and drawings. All the elements throughout the specification and drawings may be circuits.

As used herein, the singular forms "a", "an" and "the" are intended to include the plural forms as well, unless the context clearly indicates otherwise.

FIG. 1A is a cross-sectional diagram illustrating a side view of a display apparatus 10 according to an exemplary embodiment of the present inventive concept.

Referring to FIG. 1A, the display apparatus 10 includes a display panel 100, a panel driver, a backlight unit BLU, a rear cover RC, a bezel BZ and an image sensor 300.

The display panel 100 is disposed on a first surface (e.g., a front surface) of the display apparatus. The display panel 100 displays an image through a front side F of the display apparatus 10.

The backlight unit BLU is disposed behind the display panel 100. The backlight unit BLU supplies light to the display panel 100.

The rear cover RC is disposed behind the backlight unit BLU. The rear cover RC may be disposed on a second surface of the display apparatus 10 opposite to the first surface of the display apparatus 10. The rear cover RC protects the display panel 100 and the backlight unit BLU from external impacts.

The bezel BZ is disposed at an edge of the display apparatus 10. For example, the bezel BZ may be disposed at an edge of the display apparatus 10 opposite to the backlight unit BLU. The bezel BZ secures (e.g., holds or supports) the display panel 100, the backlight unit BLU, and the rear cover RC.

The image sensor 300 senses a background image around the display apparatus 10. The image sensor 300 may be mounted on the second surface of the display apparatus 10 opposite to the first surface of the display apparatus 10. The image sensor 300 may be mounted on the bezel BZ. The image sensor 300 may sense the background image of a rear side R of the display apparatus 10.

Figure 1B:
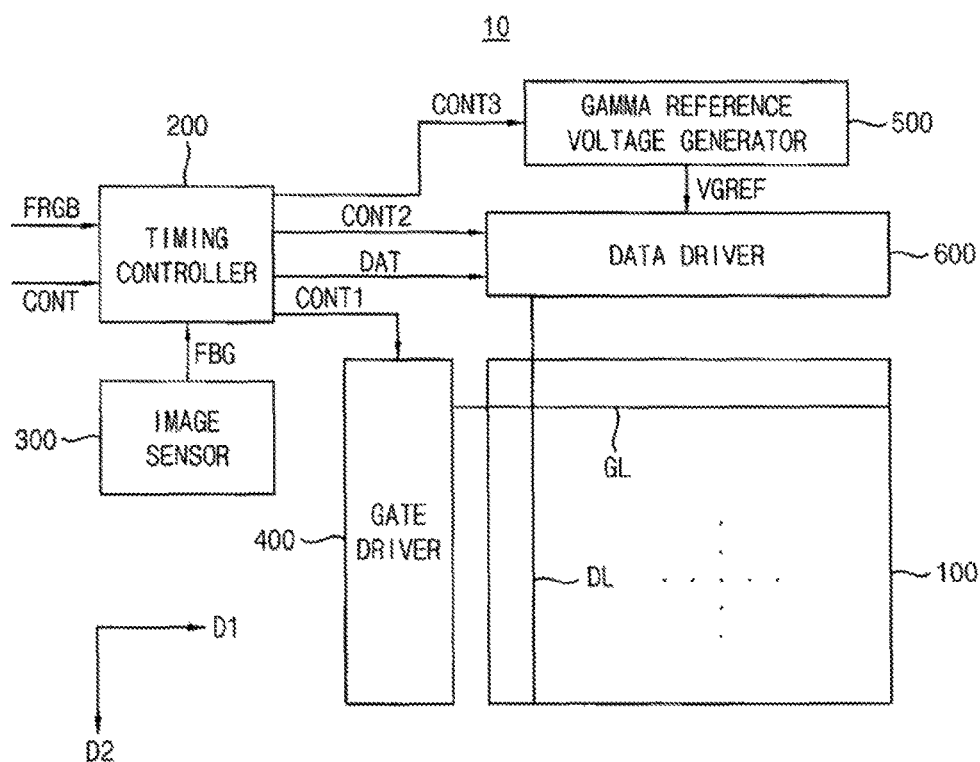
FIG. 1B is a block diagram illustrating the display apparatus of FIG. 1A according to an exemplary embodiment of the present inventive concept.

FIG. 1B is a block diagram illustrating the display apparatus 10 of FIG. 1A according to an exemplary embodiment of the present inventive concept.

Referring to FIG. 1B, the display apparatus 10 includes a display panel 100, an image sensor 300 and a panel driver. The panel driver includes a timing controller 200, a gate driver 400, a gamma reference voltage generator 500 and a data driver 600.

The display panel 100 includes a display region for displaying an image and a peripheral region adjacent to the display region. The display region includes a first area (e.g., R1 in each of FIG. 3C, 4C, 5C or 6C) and a second area (e.g., R2 in each of FIG. 3C, 4C, 5C or 6C) different from the first area.

The display panel 100 includes a plurality of gate lines GL, a plurality of data lines DL and a plurality of pixels, each of which is connected to one of the gate lines GL and one of the data lines DL. The gate lines GL extend in a first direction D1 and the data lines DL extend in a second direction D2 crossing the first direction D1.

In an exemplary embodiment of the present inventive concept, each of the pixels includes a switching element, a liquid crystal capacitor and a storage capacitor. The liquid crystal capacitor and the storage capacitor are electrically connected to the switching element. The pixels may be arranged in a matrix configuration. The pixels include a first group of pixels disposed on the first area and a second group of pixels disposed on the second area.

A display panel according to an exemplary embodiment of the present inventive concept will be described in detail with reference to FIGS. 3A, 3B, 3C, 4A, 4B, 4C, 5A, 5B, 5C, 6A, 6B and 6C.

The image sensor 300 senses a background image around the display apparatus 10. The background image may be a background image of a rear side of the display apparatus 10. The image sensor 300 generates background image data FBG based on the sensed background image. The image sensor 300 outputs the generated background image data FBG to the timing controller 200. For example, the image sensor 300 may include a complementary metal-oxide-semiconductor (CMOS) image sensor or a charge-coupled device (CCD) image sensor.

The timing controller 200 receives input image data FRGB and an input control signal CONT from an external device. The timing controller 200 receives the background image data FBG from the image sensor 300. The input image data FRGB may include red image data R, green image data G and blue image data B. The input control signal CONT may include a master clock signal and a data enable signal. The input control signal CONT may further include a vertical synchronizing signal and a horizontal synchronizing signal.

The timing controller 200 generates a first control signal CONT1, a second control signal CONT2, a third control signal CONT3 and a data signal DAT based on the input image data FRGB, the background image data FBG and the input control signal CONT.

The timing controller 200 generates the first control signal CONT1, which controls operations of the gate driver 400, based on the input control signal CONT, and outputs the first control signal CONT1 to the gate driver 400. The first control signal CONT1 may include a vertical start signal and a gate clock signal.

The timing controller 200 generates the second control signal CONT2, which controls operations of the data driver 600, based on the input control signal CONT, and outputs the second control signal CONT2 to the data driver 600. The second control signal CONT2 may include a horizontal start signal and a load signal.

The timing controller 200 generates partial image data RGB based on the input image data FRGB. The partial image data RGB corresponds to the first area of the display panel 100 out of the input image data FRGB.

The timing controller 200 generates partial background image data BG based on the background image data FBG. The partial background image data BG corresponds to the second area of the display panel 100 out of the background data FBG.

The timing controller 200 generates the data signal DAT based on the partial image data RGB and the partial background image data BG. The data signal DAT may be a data signal corresponding to a composite image of the partial image data RGB and the partial background image data BG. The timing controller 200 outputs the data signal DAT to the data driver 600.

The timing controller 200 generates the third control signal CONT3, which controls operations of the gamma reference voltage generator 500, based on the input control signal CONT, and outputs the third control signal CONT3 to the gamma reference voltage generator 500.

The timing controller 200 will be described in detail with reference to FIG. 2.

The gate driver 400 generates gate signals for driving the gate lines GL in response to the first control signal CONT1 received from the timing controller 200. The gate driver 400 sequentially outputs the gate signals to the gate lines GL.

In an exemplary embodiment of the present inventive concept, the gate driver 400 may be directly mounted on the display panel 100, or may be connected to the display panel 100 as a tape carrier package (TCP) type. In an exemplary embodiment of the present inventive concept, the gate driver 400 may be integrated on the peripheral region of the display panel 100.

The gamma reference voltage generator 500 generates a gamma reference voltage VGREF in response to the third control signal CONT3 received from the timing controller 200. The gamma reference voltage generator 500 outputs the gamma reference voltage VGREF to the data driver 600. The level of the gamma reference voltage VGREF corresponds to grayscales of a plurality of pixel data included in the data signal DAT.

In an exemplary embodiment of the present inventive concept, the gamma reference voltage generator 500 may be disposed in the timing controller 200, or may be disposed in the data driver 600.

The data driver 600 receives the second control signal CONT2 and the data signal DAT from the timing controller 200, and receives the gamma reference voltage VGREF from the gamma reference voltage generator 500. The data driver 600 converts the data signal DAT to data voltages having analogue levels based on the gamma reference voltage VGREF. The data driver 600 outputs the data voltages to the data lines DL.

In an exemplary embodiment of the present inventive concept, the data driver 600 may be directly mounted on the display panel 100, or may be connected to the display panel 100 as a tape carrier package (TCP) type. In an exemplary embodiment of the present inventive concept, the data driver 600 may be integrated on the peripheral region of the display panel 100.

Figure 2:
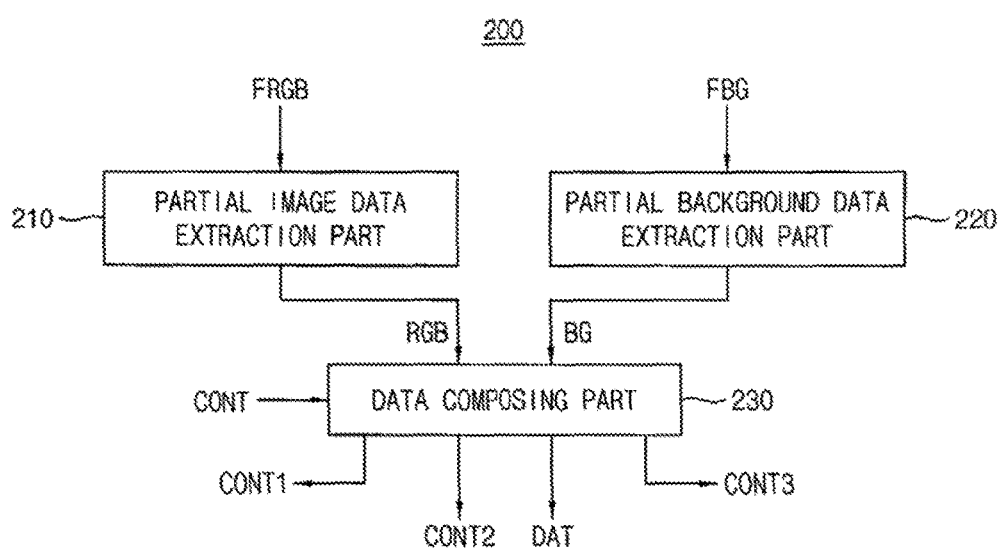
FIG. 2 is a block diagram illustrating a timing controller included in the display apparatus of FIG. 1B according to an exemplary embodiment of the present inventive concept.
Figure 3A:
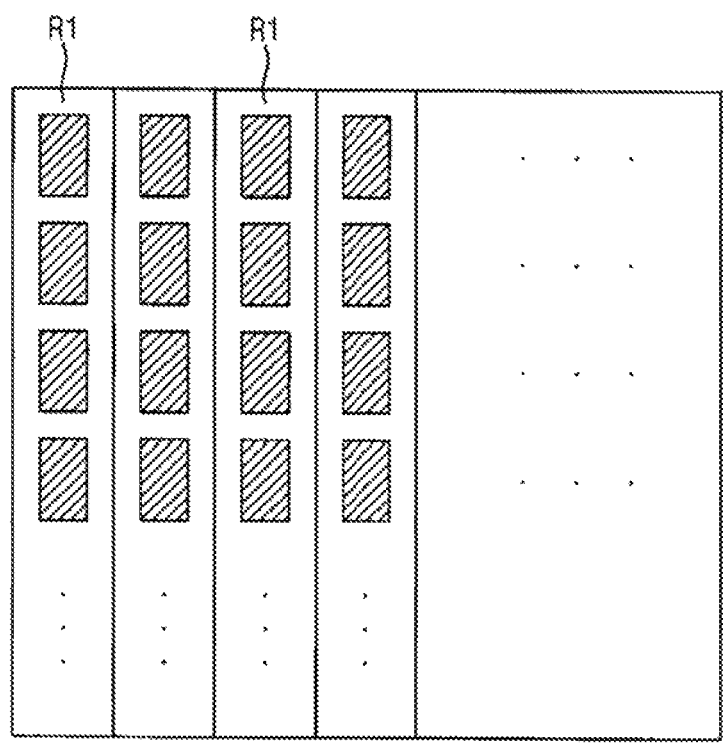
FIG. 3A is a diagram illustrating an input image displayed on pixels of a display panel according to an exemplary embodiment of the present inventive concept.
Figure 3B:
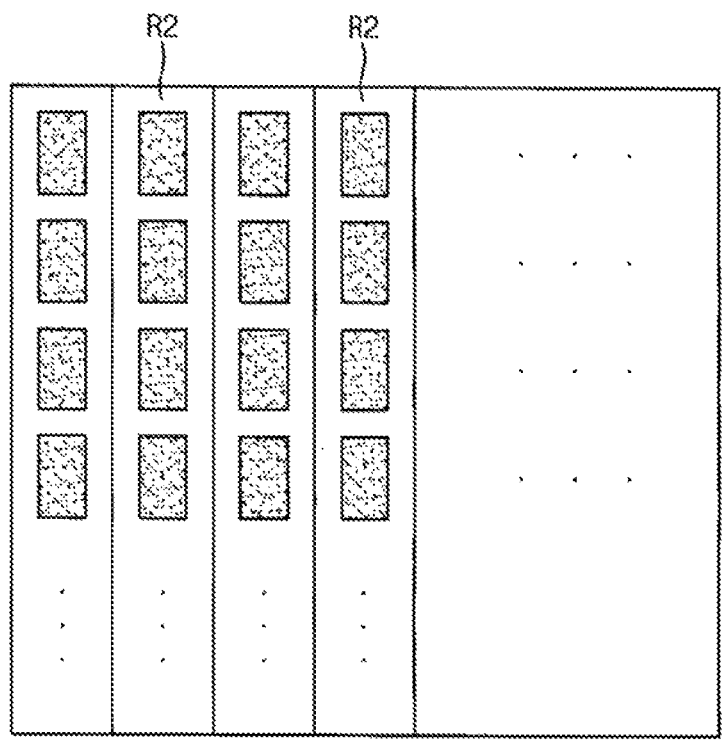
FIG. 3B is a diagram illustrating a background image displayed on pixels of a display panel according to an exemplary embodiment of the present inventive concept.
Figure 3C:
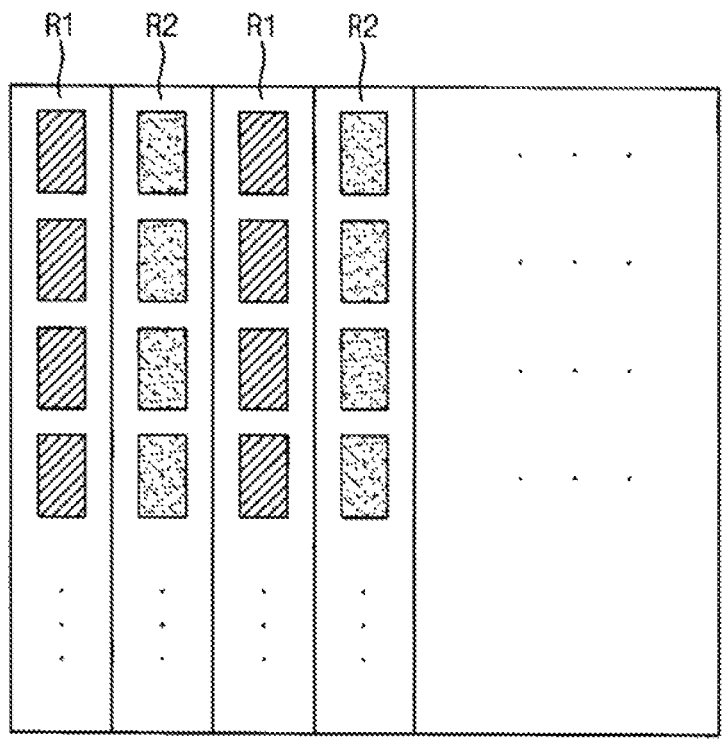
FIG. 3C is a diagram illustrating a composite image displayed on pixels of a display panel according to an exemplary embodiment of the present inventive concept.

FIG. 2 is a block diagram illustrating a timing controller included in the display apparatus 10 of FIG. 1B according to an exemplary embodiment of the present inventive concept. FIG. 3A is a diagram illustrating an input image displayed on pixels of a display panel according to an exemplary embodiment of the present inventive concept. FIG. 3B is a diagram illustrating a background image displayed on pixels of a display panel according to an exemplary embodiment of the present inventive concept. FIG. 3C is a diagram illustrating a composite image displayed on pixels of a display panel according to an exemplary embodiment of the present inventive concept.

Referring to FIGS. 1B, 2 and 3A to 3C, the display panel (e.g., 100 of FIG. 1B) includes a first area R1 and a second area R2 different from the first area R1. The pixels are arranged in a matrix configuration. The first area R1 may be an area corresponding to odd-numbered columns of the matrix, and the second area R2 may be an area corresponding to even-numbered columns of the matrix. In an exemplary embodiment of the present inventive concept, the first area R1 may be the area corresponding to even-numbered columns of the matrix, and the second area R2 may be the area corresponding to odd-numbered columns of the matrix. The pixels include the first group of pixels disposed on the first area R1 and the second group of pixels disposed on the second area R2.

The timing controller 200 includes a partial image data extraction part 210, a partial background image data extraction part 220 and a data composing part 230.

The partial image data extraction part 210 receives the input image data FRGB from the external device. The partial image data extraction part 210 generates the partial image data RGB based on the input image data FRGB. The partial image data RGB corresponds to the first area R1 out of the input image data FRGB. The partial image data extraction part 210 outputs the partial image data RGB to the data composing part 230.

The partial background image data extraction part 220 receives the background image data FBG from the image sensor 300. The partial background image data extraction part 220 generates the partial background image data BG based on the background image data FBG. The partial background image data BG corresponds to the second area R2 out of the background image data FBG. The partial background image data extraction part 220 outputs the partial background image data BG to the data composing part 230.

A resolution of the input image data FRGB may be substantially the same as a resolution of the background image data FBG. The resolution may be understood to mean the number of pixels displaying an image per unit area.

The data composing part 230 receives the input control signal CONT from the external device. The data composing part 230 receives the partial image data RGB from the partial image data extraction part 210. The data composing part 230 receives the partial background image data BG from the partial background image data extraction part 220.

The data composing part 230 generates the first control signal CONT1, which controls operations of the gate driver 400, based on the input control signal CONT, and outputs the first control signal CONT1 to the gate driver 400. The data composing part 230 generates the second control signal CONT2, which controls operations of the data driver 600, based on the input control signal CONT, and outputs the second control signal CONT2 to the data driver 600. The data composing part 230 generates the data signal DAT based on the partial image data RGB and the partial background image data BG. The data signal DAT may be a data signal corresponding to the composite image of the partial image data RGB and the partial background image data BG. The data composing part 230 outputs the data signal DAT to the data driver 600. The data composing part 230 generates the third control signal CONT3, which controls operations of the gamma reference voltage generator 500, based on the input control signal CONT, and outputs the third control signal CONT3 to the gamma reference voltage generator 500.

The data driver 600 receives the second control signal CONT2 and the data signal DAT from the data composing part 230. The data driver 600 outputs data voltages corresponding to the partial image data RGB to the first group of pixels. The data driver 600 outputs data voltages corresponding to the partial background image data BG to the second group of pixels.

Figure 4A:
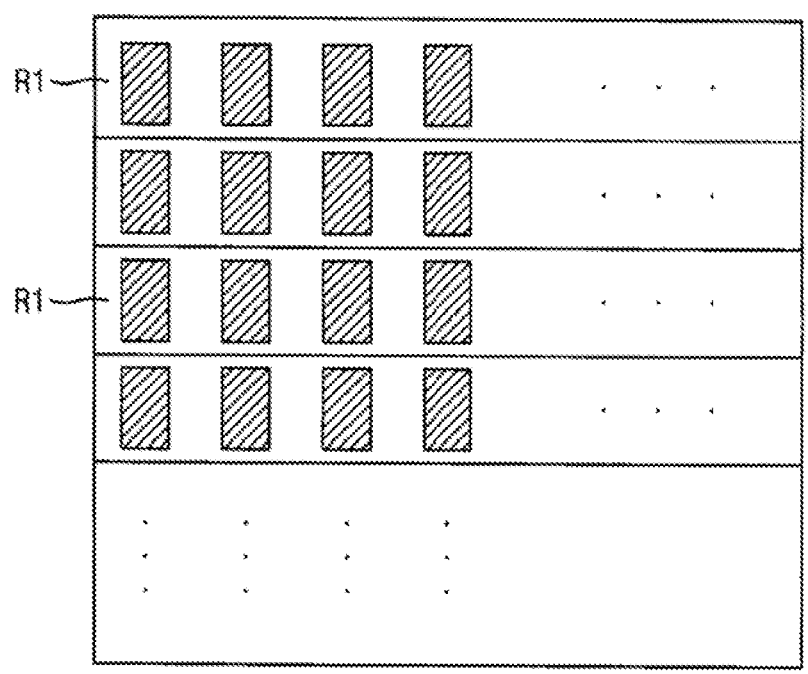
FIG. 4A is a diagram illustrating an input image displayed on pixels of a display panel according to an exemplary embodiment of the present inventive concept.
Figure 4B:
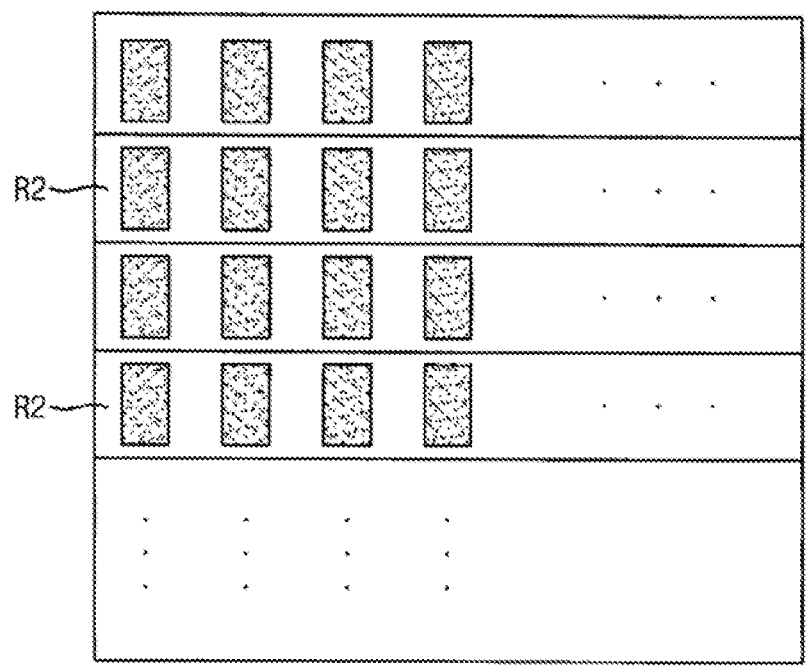
FIG. 4B is a diagram illustrating a background image displayed on pixels of a display panel according to an exemplary embodiment of the present inventive concept.
Figure 4C:
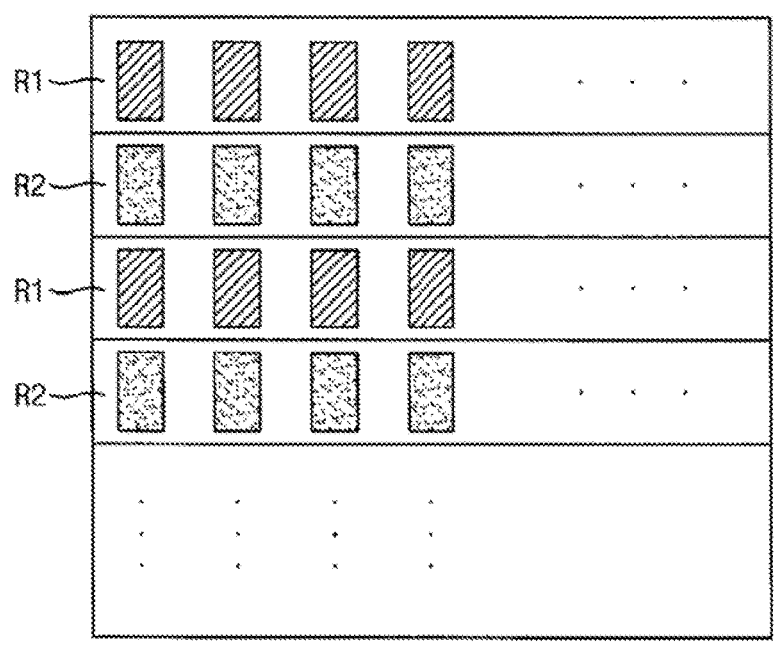
FIG. 4C is a diagram illustrating a composite image displayed on pixels of a display panel according to an exemplary embodiment of the present inventive concept.

FIG. 4A is a diagram illustrating an input image displayed on pixels of a display panel according to an exemplary embodiment of the present inventive concept. FIG. 4B is a diagram illustrating a background image displayed on pixels of a display panel according to an exemplary embodiment of the present inventive concept. FIG. 4C is a diagram illustrating a composite image displayed on pixels of a display panel according to an exemplary embodiment of the present inventive concept.

Hereinafter, repetitive description of the same elements as those of FIGS. 3A to 3C will be omitted.

Referring to FIGS. 1B, 2 and 4A to 4C, the display panel (e.g., 100 of FIG. 1B) includes a first area R1 and a second area R2 different from the first area R1. The pixels are arranged in a matrix configuration. The first area R1 may be an area corresponding to odd-numbered rows of the matrix, and the second area R2 may be an area corresponding to even-numbered rows of the matrix. In an exemplary embodiment of the present inventive concept, the first area R1 may be the area corresponding to even-numbered rows of the matrix, and the second area R2 may be the area corresponding to odd-numbered rows of the matrix. The pixels include the first group of pixels disposed on the first area R1 and the second group of pixels disposed on the second area R2.

The partial image data RGB corresponds to the first area R1 out of the input image data FRGB. The partial background image data BG corresponds to the second area R2 out of the background image data FBG. A resolution of the input image data FRGB may be substantially the same as a resolution of the background image data FBG. The data composing part 230 generates the data signal DAT based on the partial image data RGB and the partial background image data BG. The data signal DAT may be a data signal corresponding to the composite image of the partial image data RGB and the partial background image data BG. The data driver 600 outputs data voltages corresponding to the partial image data RGB to the first group of pixels. The data driver 600 outputs data voltages corresponding to the partial background image data BG to the second group of pixels.

Figure 5A:
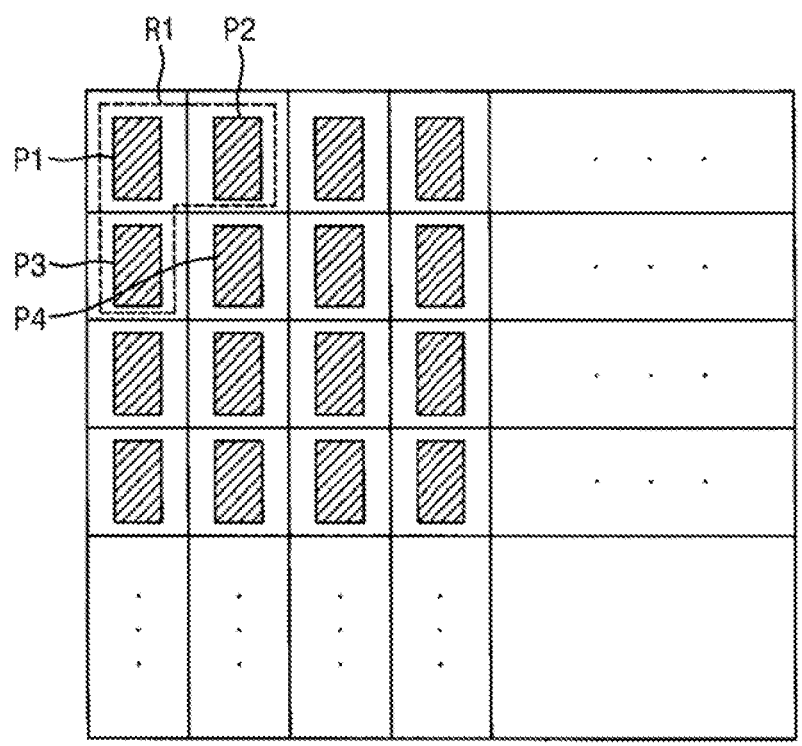
FIG. 5A is a diagram illustrating an input image displayed on pixels of a display panel according to an exemplary embodiment of the present inventive concept.
Figure 5B:
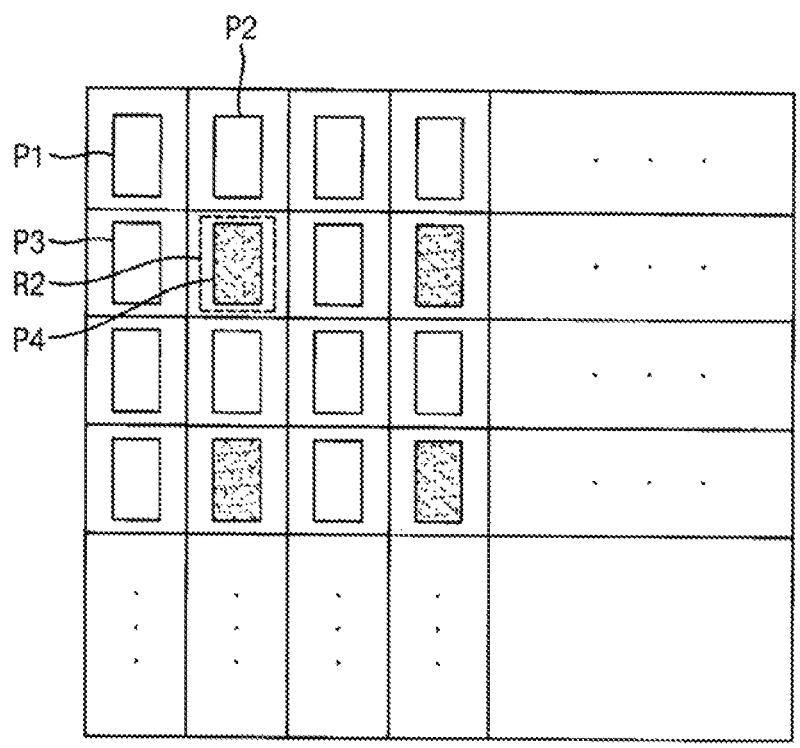
FIG. 5B is a diagram illustrating a background image displayed on pixels of a display panel according to an exemplary embodiment of the present inventive concept.
Figure 5C:
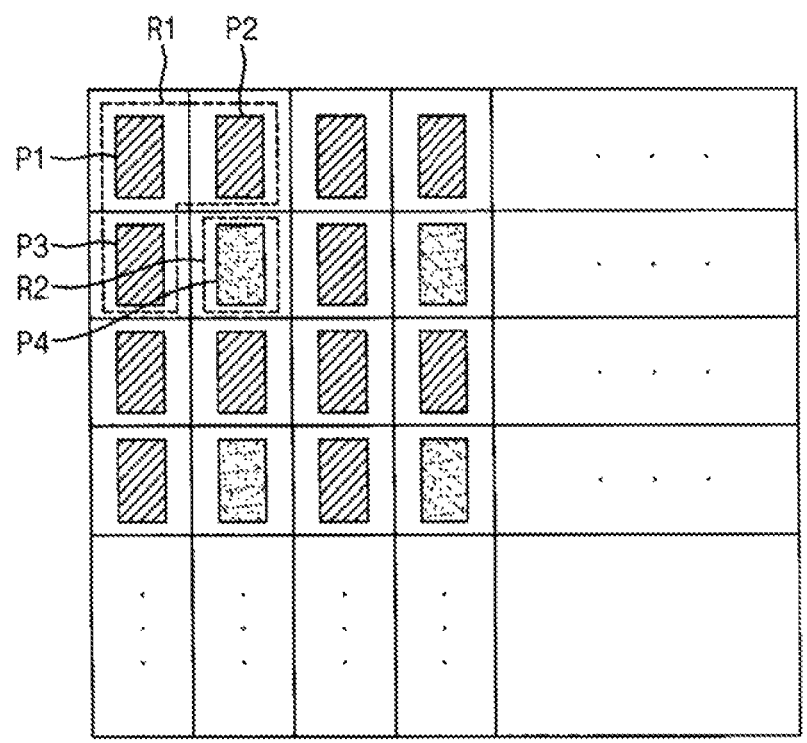
FIG. 5C is a diagram illustrating a composite image displayed on pixels of a display panel according to an exemplary embodiment of the present inventive concept.

FIG. 5A is a diagram illustrating an input image displayed on pixels of a display panel according to an exemplary embodiment of the present inventive concept. FIG. 5B is a diagram illustrating a background image displayed on pixels of a display panel according to an exemplary embodiment of the present inventive concept. FIG. 5C is a diagram illustrating a composite image displayed on pixels of a display panel according to an exemplary embodiment of the present inventive concept.

Hereinafter, repetitive description of the same elements as those of FIGS. 3A to 3C will be omitted.

Referring to FIGS. 1B, 2 and 5A to 5C, the display panel (e.g., 100 of FIG. 1B) includes a first area R1 and a second area R2 different from the first area R1. The pixels are arranged in a matrix configuration. The pixels include the first group of pixels disposed on the first area R1 and the second group of pixels disposed on the second area R2. The first group of pixels may include a first pixel P1 disposed on (1, 1) of the matrix, a second pixel P2 disposed on (1, 2) of the matrix and a third pixel P3 disposed on (2, 1) of the matrix. The second group of pixels may include a fourth pixel P4 disposed on (2, 2) of the matrix. In an exemplary embodiment of the present inventive concept, the second group of pixels may include the first pixel P1, and the first group of pixels may include the second pixel P2, the third pixel P3 and the fourth pixel P4. In an exemplary embodiment of the present inventive concept, the second group of pixels may include the second pixel P2, and the first group of pixels may include the first pixel P1, the third pixel P3 and the fourth pixel P4. In an exemplary embodiment of the present inventive concept, the second group of pixels may include the third pixel P3, and the first group of pixels may include the first pixel P1, the second pixel P2 and the fourth pixel P4.

Although FIGS. 5A-5C illustrate that the first group of pixels includes three pixels of a 2×2 matrix and the second group of pixels includes a single pixel of the 2×2 matrix, the present inventive concept is not limited thereto. For example, the first group of pixels may include m pixels of an i×j matrix and the second group of pixels includes n pixels of the i×j matrix. Here, i and j are positive integer greater than one, m is a positive integer smaller than a result of multiplying i with j, and n is a positive integer smaller than m.

The partial image data RGB corresponds to the first area R1 out of the input image data FRGB. The partial background image data BG corresponds to the second area R2 out of the background image data FBG A resolution of the input image data FRGB may be higher than a resolution of the background image data FBG. In this case, the number of pixels of the first group of pixels may be higher than the number of pixels of the second group of pixels. For example, the resolution of the input image data FRGB may be p times (e.g., four times) higher than the resolution of the background image data FBG. Here, p is a positive integer greater than one. In this case, the number of pixels of the first group of pixels may be m/n times (e.g., three times) higher than the number of pixels of the second group of pixels. Here, '/' indicates division.

The data composing part 230 generates the data signal DAT based on the partial image data RGB and the partial background image data BG. The data signal DAT may be a data signal corresponding to the composite image of the partial image data RGB and the partial background image data BG. The data driver 600 outputs data voltages corresponding to the partial image data RGB to the first group of pixels. The data driver 600 outputs data voltages corresponding to the partial background image data BG to the second group of pixels.

Figure 6A:
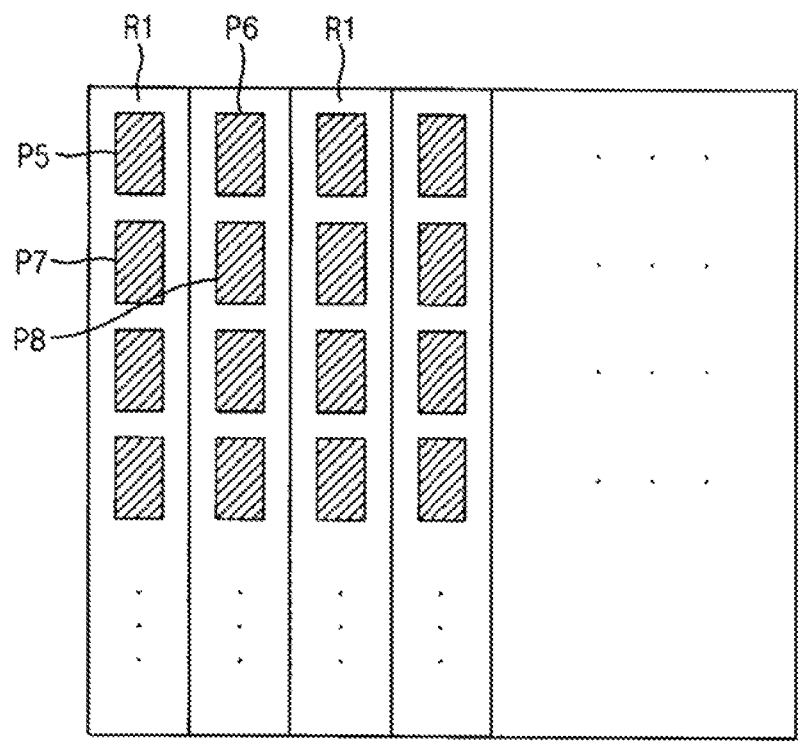
FIG. 6A is a diagram illustrating an input image displayed on pixels of a display panel according to an exemplary embodiment of the present inventive concept.
Figure 6B:
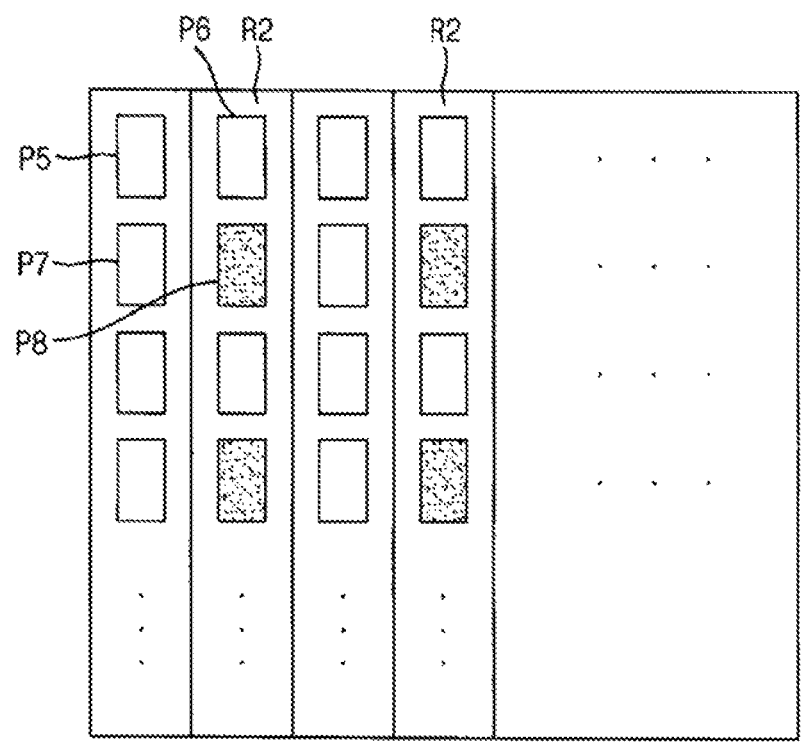
FIG. 6B is a diagram illustrating a background image displayed on pixels of a display panel according to an exemplary embodiment of the present inventive concept.
Figure 6C:
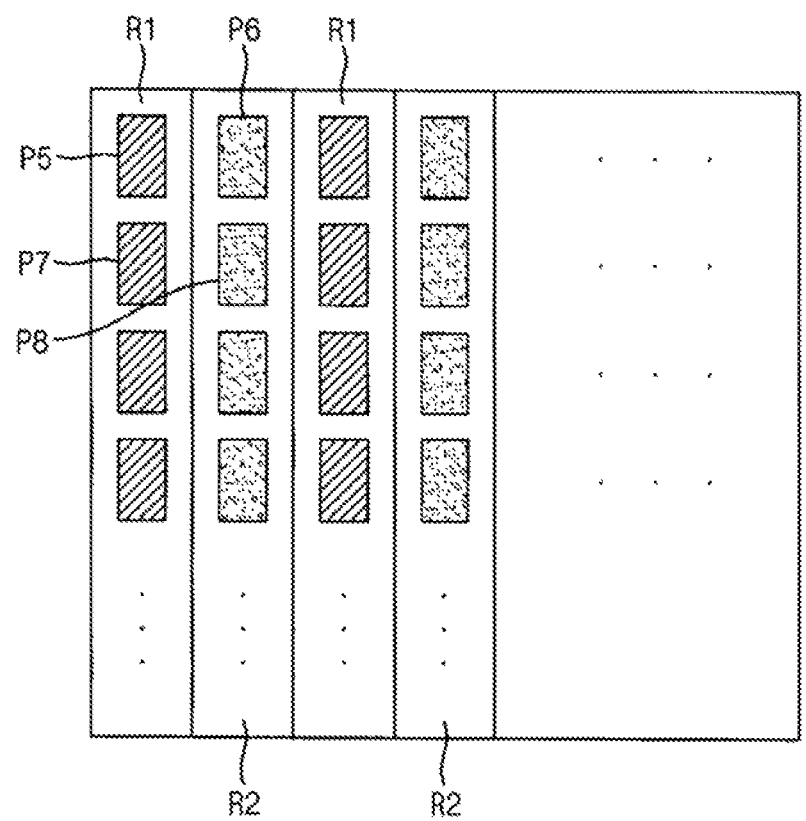
FIG. 6C is a diagram illustrating a composite image displayed on pixels of a display panel according to an exemplary embodiment of the present inventive concept.

FIG. 6A is a diagram illustrating an input image displayed on pixels of a display panel according to an exemplary embodiment of the present inventive concept. FIG. 6B is a diagram illustrating a background image displayed on pixels of a display panel according to an exemplary embodiment of the present inventive concept. FIG. 6C is a diagram illustrating a composite image displayed on pixels of a display panel according to an exemplary embodiment of the present inventive concept.

Hereinafter, repetitive description of the same elements as those of FIGS. 3A to 3C will be omitted.

Referring to FIGS. 1B, 2 and 6A to 6C, the display panel (e.g., 100 of FIG. 1B) includes a first area R1 and a second area R2 different from the first area R1. The pixels are arranged in a matrix configuration. The first area R1 may be an area corresponding to odd-numbered columns of the matrix, and the second area R2 may be an area corresponding to even-numbered columns of the matrix. In an exemplary embodiment of the present inventive concept, the first area R1 may be the area corresponding to even-numbered columns of the matrix, and the second area R2 may be the area corresponding to odd-numbered columns of the matrix. The pixels include the first group of pixels disposed on the first area R1 and the second group of pixels disposed on the second area R2. The first group of pixels may include a fifth pixel P5 disposed on (1, 1) of the matrix and a seventh pixel P7 disposed on (2, 1) of the matrix. The second group of pixels may include a sixth pixel P6 disposed on (1, 2) of the matrix and an eighth pixel P8 disposed on (2, 2) of the matrix. In an exemplary embodiment of the present inventive concept, the first group of pixels may include the sixth pixel P6 disposed on (1, 2) of the matrix and the eighth pixel P8 disposed on (2, 2) of the matrix, and the second group of pixels may include the fifth pixel P5 disposed on (1, 1) of the matrix and the seventh pixel P7 disposed on (2, 1) of the matrix.

The partial image data RGB corresponds to the first area R1 out of the input image data FRGB. The partial background image data BG corresponds to the second area R2 out of the background image data FBG A resolution of the input image data FRGB may be higher than a resolution of the background image data FBG. For example, the resolution of the input image data FRGB may be p times (e.g., four times) higher than the resolution of the background image data FBG. In this case, the number of pixels of the first group of pixels may be substantially the same as the number of pixels of the second group of pixels.

The data composing part 230 generates the data signal DAT based on the partial image data RGB and the partial background image data BG. The data composing part 230 may double the partial background image data BG. For example, the data composing part 230 may copy data corresponding to the eighth pixel P8 to the sixth pixel P6 when the sixth and eighth pixels P6 and P8 are included in the second group of pixels. The data signal DAT may be a data signal corresponding to the composite image of the partial image data RGB and the partial background image data BG. The data driver 600 outputs data voltages corresponding to the partial image data RGB to the first group of pixels. The data driver 600 outputs data voltages corresponding to the partial background image data BG to the second group of pixels.

Figure 7:
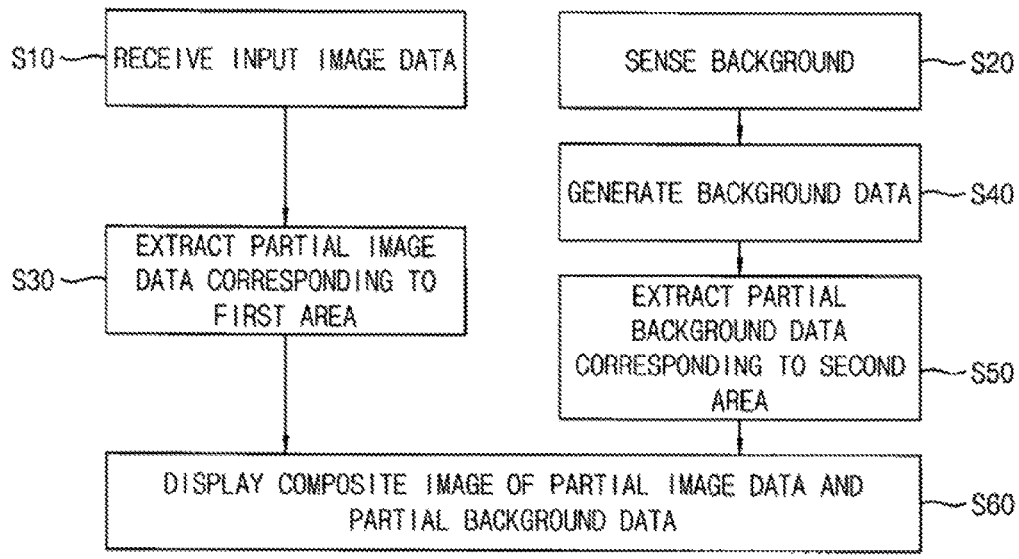
FIG. 7 is a flow chart illustrating a method of driving a display apparatus according to an exemplary embodiment of the present inventive concept.

FIG. 7 is a flow chart illustrating a method of driving a display apparatus according to an exemplary embodiment of the present inventive concept.

Referring to FIGS. 1B, 2 and 7, the partial image data extraction part 210 receives the input image data FRGB from the external device (S10). The partial image data extraction part 210 extracts the partial image data RGB corresponding to the first area of the display panel 100 from the input image data FRGB (S30).

The image sensor 300 senses the background image (S20). The image sensor 300 generates the background image data FBG based on the background image (S40). The partial background image data extraction part 220 extracts the partial background image data BG corresponding to the second area of the display panel 100 from the background image data FBG (S50).

The composite image of the partial image data RGB and the partial background image data BG is displayed on the display panel 100 (S60).

Figure 8A:
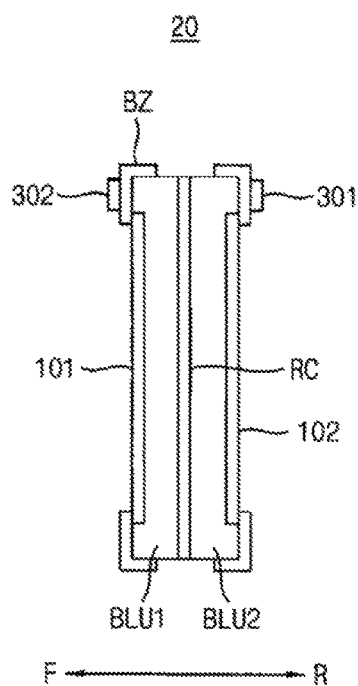
FIG. 8A is a cross-sectional diagram illustrating a side view of a display apparatus according to an exemplary embodiment of the present inventive concept.

FIG. 8A is a cross-sectional diagram illustrating a side view of a display apparatus 20 according to an exemplary embodiment of the present inventive concept.

Referring to FIG. 8A, the display apparatus 20 includes a first display panel 101, a second display panel 102, a first panel driver, a second panel driver, a first backlight unit BLU1, a second backlight unit BLU2, a rear cover RC, a bezel BZ, a first image sensor 301 and a second image sensor 302.

The first display panel 101 is disposed on a first surface (e.g., a front surface) of the display apparatus 20. The first display panel 101 displays an image through a front side F of the display apparatus 20.

The first backlight unit BLU1 is disposed behind the first display panel 101. The first backlight unit BLU1 supplies light to the first display panel 101.

The first image sensor 301 senses a first background image around the display apparatus 20. The first image sensor 301 may be mounted on a second surface of the display apparatus 20 opposite to the first surface of the display apparatus 20. The first image sensor 301 may be mounted on the bezel BZ. The first image sensor 301 may sense the first background image of a rear side R of the display apparatus 20.

The second display panel 102 is disposed on the second surface of the display apparatus. The second display panel 102 displays an image through the rear side R of the display apparatus 20.

The second backlight unit BLU2 is adjacent to the second display panel 102. For example, the second backlight unit BLU2 may be disposed between the first backlight unit BLU1 and the second display panel 102. The second backlight unit BLU2 supplies light to the second display panel 102.

The second image sensor 302 senses a second background image around the display apparatus 20. The second image sensor 302 may be mounted on the first surface of the display apparatus 20. The second image sensor 302 may be mounted on the bezel BZ. The second image sensor 302 may sense the second background image of the front side F of the display apparatus 20.

The rear cover RC is disposed between the first backlight unit BLU1 and the second backlight unit BLU2.

The bezel BZ is disposed at an edge of the display apparatus 20. For example, the bezel BZ may be disposed at an edge of the display apparatus 20 opposite to the backlight unit BLU. The bezel BZ secures (e.g., holds or supports) the first display panel 101, the first backlight unit BLU1, the second display panel 102, the second backlight unit BLU2 and the rear cover RC. The rear cover RC protects the first display panel 101, the first backlight unit BLU1, the second display panel 102, the second backlight unit BLU2 and the rear cover RC from external impacts.

Figure 8B:
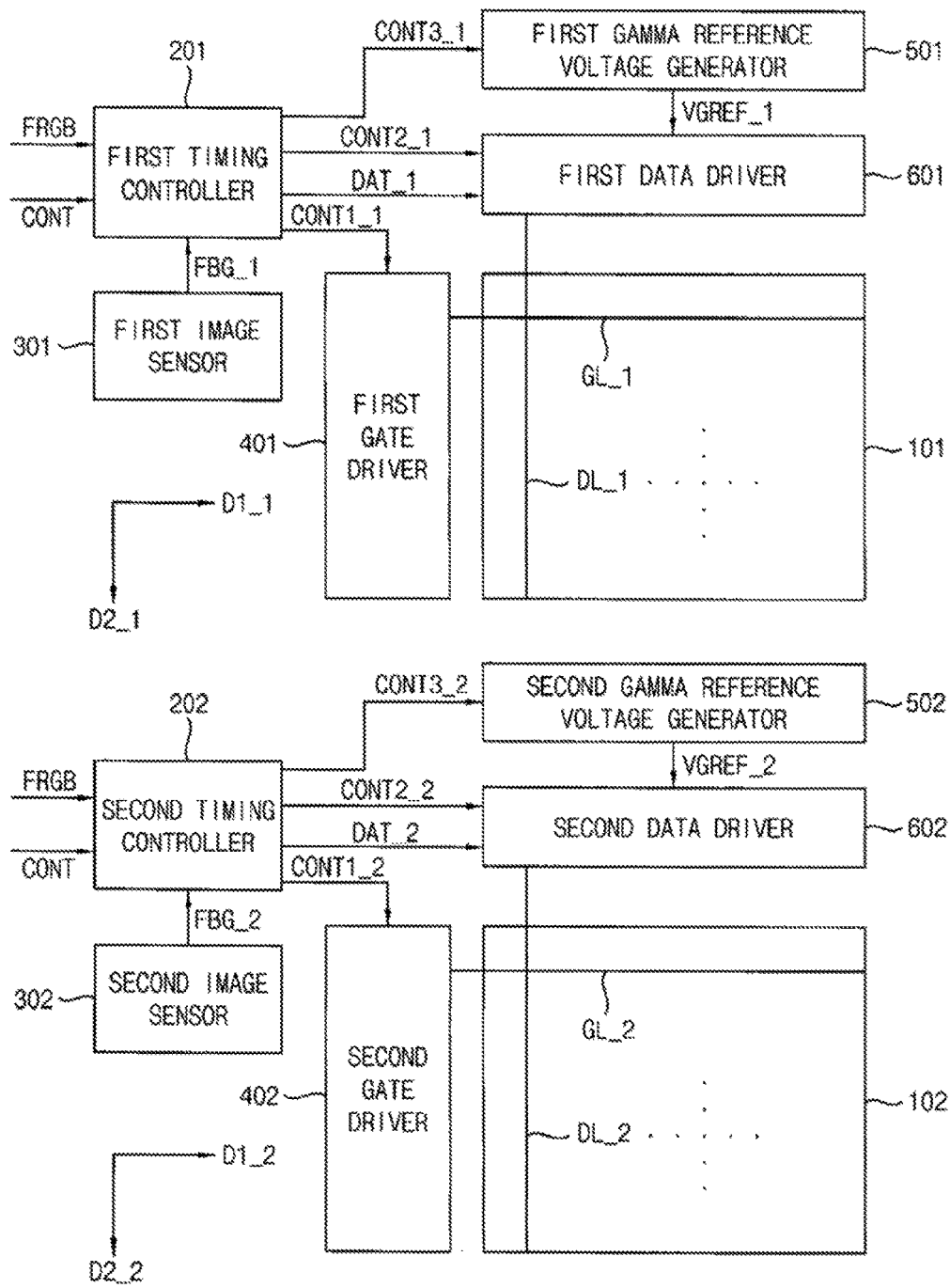
FIG. 8B is a block diagram illustrating the display apparatus of FIG. 8A according to an exemplary embodiment of the present inventive concept.

FIG. 8B is a block diagram illustrating the display apparatus 20 of FIG. 8A according to an exemplary embodiment of the present inventive concept.

Hereinafter, repetitive description of the same elements as those of FIG. 1B will be omitted.

Referring to FIG. 8B, the display apparatus 20 includes a first display panel 101, a first image sensor 301, a first panel driver, a second display panel 102, a second image sensor 302 and a second panel driver. The first panel driver includes a first timing controller 201, a first gate driver 401, a first gamma reference voltage generator 501 and a first data driver 601. The second panel driver includes a second timing controller 202, a second gate driver 402, a second gamma reference voltage generator 502 and a second data driver 602.

The first display panel 101 includes a first display region for displaying an image and a first peripheral region adjacent to the first display region. The first display region includes a first area (e.g., R1 in each of FIG. 3C, 4C, 5C or 6C) and a second area (e.g., R2 in each of FIG. 3C, 4C, 5C or 6C) different from the first area.

The first display panel 101 includes a plurality of first gate lines GL_1, a plurality of first data lines DL_1 and a plurality of first pixels, each of which is connected to one of the first gate lines GL_1 and one of the first data lines DL_1. The first gate lines GL_1 extend in a first front direction D1_1 and the first data lines DL_1 extend in a second front direction D2_1 crossing the first front direction D1_1.

In an exemplary embodiment of the present inventive concept, each of the pixels includes a switching element, a liquid crystal capacitor and a storage capacitor. The liquid crystal capacitor and the storage capacitor are electrically connected to the switching element.

The plurality of first pixels may be arranged in a matrix configuration. The plurality of first pixels includes a first group of pixels disposed on the first area and a second group of pixels disposed on the second area.

The first image sensor 301 senses a first background image around the display apparatus 20. The first background image may be a background image of a rear side of the display apparatus 20. The first image sensor 301 generates first background image data FBG_1 based on the first background image. The first image sensor 301 outputs the first background image data FBG_1 to the first timing controller 201.

The first timing controller 201 receives the first background image data FBG_1 from the first image sensor 301. The first timing controller 201 generates a first front control signal CONT1_1, a second front control signal CONT2_1, a third front control signal CONT3_1 and a first data signal DAT_1 based on the input image data FRGB, the first background image data FBG_1 and the input control signal CONT.

The first timing controller 201 generates the first front control signal CONT1_1, which controls operations of the first gate driver 401, based on the input control signal CONT, and outputs the first front control signal CONT1_1 to the first gate driver 401. The first front control signal CONT1_1 may include a vertical start signal and a gate clock signal.

The first timing controller 201 generates the second front control signal CONT2_1, which controls operations of the first data driver 601, based on the input control signal CONT, and outputs the second front control signal CONT2_1 to the first data driver 601. The second front control signal CONT2_1 may include a horizontal start signal and a load signal.

The first timing controller 201 generates first partial image data (e.g., RGB_1 of FIG. 9A) based on the input image data FRGB. The first partial image data corresponds to the first area of the first display panel 101 out of the input image data FRGB.

The first timing controller 201 generates first partial background image data (e.g., BG_1 of FIG. 9A) based on the first background image data FBG_1. The first partial background image data corresponds to the second area of the first display panel 101 out of the first background image data FBG_1.

The first timing controller 201 generates the first data signal DAT_1 based on the first partial image data and the first partial background image data. The first data signal DAT_1 may be a data signal corresponding to a composite image of the first partial image data and the first partial background image data. The first timing controller 201 outputs the first data signal DAT_1 to the first data driver 601.

The first timing controller 201 generates the third front control signal CONT3_1, which controls operations of the first gamma reference voltage generator 501, based on the input control signal CONT, and outputs the third front control signal CONT3_1 to the first gamma reference voltage generator 501.

The first gate driver 401 generates gate signals for driving the first gate lines GL_1 in response to the first front control signal CONT1_1 received from the first timing controller 201. The first gate driver 401 sequentially outputs the gate signals to the first gate lines GL_1.

The first gamma reference voltage generator 501 generates a first gamma reference voltage VGREF_1 in response to the third front control signal CONT3_1 received from the first timing controller 201. The first gamma reference voltage generator 501 outputs the first gamma reference voltage VGREF_1 to the first data driver 601. The level of the first gamma reference voltage VGREF_1 corresponds to grayscales of a plurality of pixel data included in the first data signal DAT_1.

The first data driver 601 receives the second front control signal CONT2_1 and the first data signal DAT_1 from the first timing controller 201, and receives the first gamma reference voltage VGREF_1 from the first gamma reference voltage generator 501. The first data driver 601 converts the first data signal DAT_1 to first data voltages having analogue levels based on the first gamma reference voltage VGREF_1. The first data driver 601 outputs the first data voltages to the first data lines DL_1.

The second display panel 102 includes a second display region for displaying an image and a second peripheral region adjacent to the second display region. The second display region includes a third area and a fourth area different from the third area.

The second display panel 102 includes a plurality of second gate lines GL_2, a plurality of second data lines DL_2 and a plurality of second pixels, each of which is connected to one of the second gate lines GL_2 and one of the second data lines DL_2. The second gate lines GL_2 extend in a first rear direction D1_2 and the second data lines DL_2 extend in a second rear direction D2_2 crossing the first rear direction D1_2.

The plurality of second pixels may be arranged in a matrix configuration. The plurality of second pixels includes a third group of pixels disposed on the third area and a fourth group of pixels disposed on the fourth area.

The second image sensor 302 senses a second background image around the display apparatus 20. The second background image may be a background image of a front side of the display apparatus 20. The second image sensor 302 generates second background image data FBG_2 based on the second background image. The second image sensor 302 outputs the second background image data FBG_2 to the second timing controller 202.

The second timing controller 202 receives the second background image data FBG_2 from the second image sensor 302. The second timing controller 202 generates a first rear control signal CONT1_2, a second rear control signal CONT2_2, a third rear control signal CONT3_2 and a second data signal DAT_2 based on the input image data FRGB, the second background image data FBG_2 and the input control signal CONT.

The second timing controller 202 generates the first rear control signal CONT1_2, which controls operations of the second gate driver 402, based on the input control signal CONT, and outputs the first rear control signal CONT1_2 to the second gate driver 402. The first rear control signal CONT1_2 may include a vertical start signal and a gate clock signal.

The second timing controller 202 generates the second rear control signal CONT2_2, which controls operations of the second data driver 602, based on the input control signal CONT, and outputs the second rear control signal CONT2_2 to the second data driver 602. The second rear control signal CONT2_2 may include a horizontal start signal and a load signal.

The second timing controller 202 generates second partial image data (e.g., RGB_2 of FIG. 9B) based on the input image data FRGB. The second partial image data corresponds to the third area of the second display panel 102 out of the input image data FRGB.

The second timing controller 202 generates second partial background image data (e.g., BG_2 of FIG. 9B) based on the second background image data FBG_2. The second partial background image data corresponds to the fourth area of the second display panel 102 out of the second background image data FBG_2.

The second timing controller 202 generates the second data signal DAT_2 based on the second partial image data and the second partial background image data. The second data signal DAT_2 may be a data signal corresponding to a composite image of the second partial image data and the second partial background image data. The second timing controller 202 outputs the second data signal DAT_2 to the second data driver 602.

The second timing controller 202 generates the third rear control signal CONT3_2, which controls operations of the second gamma reference voltage generator 502, based on the input control signal CONT, and outputs the third rear control signal CONT3_2 to the second gamma reference voltage generator 502.

The second gate driver 402 generates gate signals for driving the second gate lines GL_2 in response to the first rear control signal CONT1_2 received from the second timing controller 202. The second gate driver 402 sequentially outputs the gate signals to the second gate lines GL_2.

The second gamma reference voltage generator 502 generates a second gamma reference voltage VGREF_2 in response to the third rear control signal CONT3_2 received from the second timing controller 202. The second gamma reference voltage generator 502 outputs the second gamma reference voltage VGREF_2 to the second data driver 602. The level of the second gamma reference voltage VGREF_2 corresponds to grayscales of a plurality of pixel data included in the second data signal DAT_2.

The second data driver 602 receives the second rear control signal CONT2_2 and the second data signal DAT_2 from the second timing controller 202, and receives the second gamma reference voltage VGREF_2 from the second gamma reference voltage generator 502. The second data driver 602 converts the second data signal DAT_2 to second data voltages having analogue levels based on the second gamma reference voltage VGREF_2. The second data driver 602 outputs the second data voltages to the second data lines DL_2.

Figure 9A:
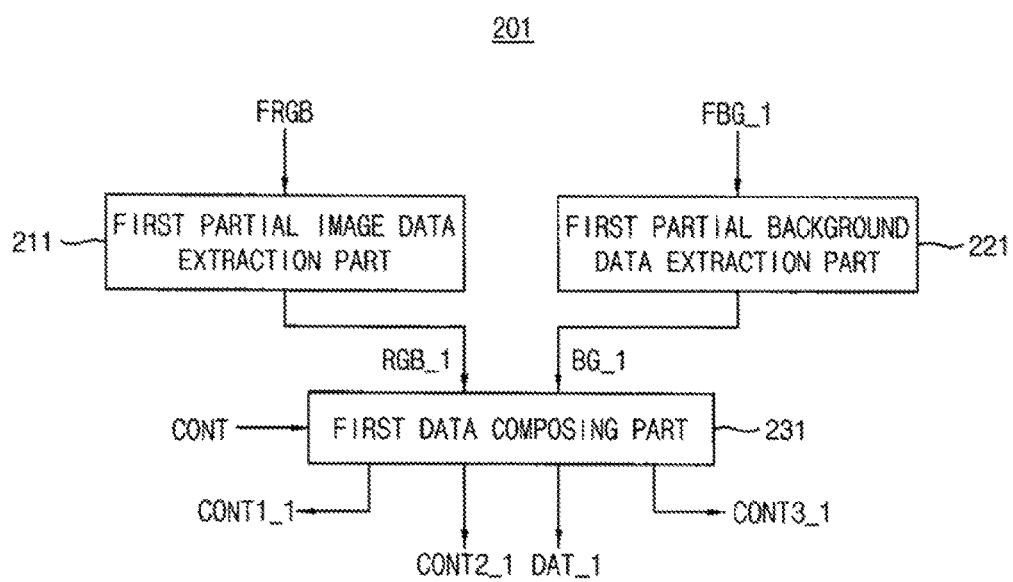
FIG. 9A is a block diagram illustrating a first timing controller included in a the display apparatus of FIG. 8B according to an exemplary embodiment of the present inventive concept.
Figure 9B:
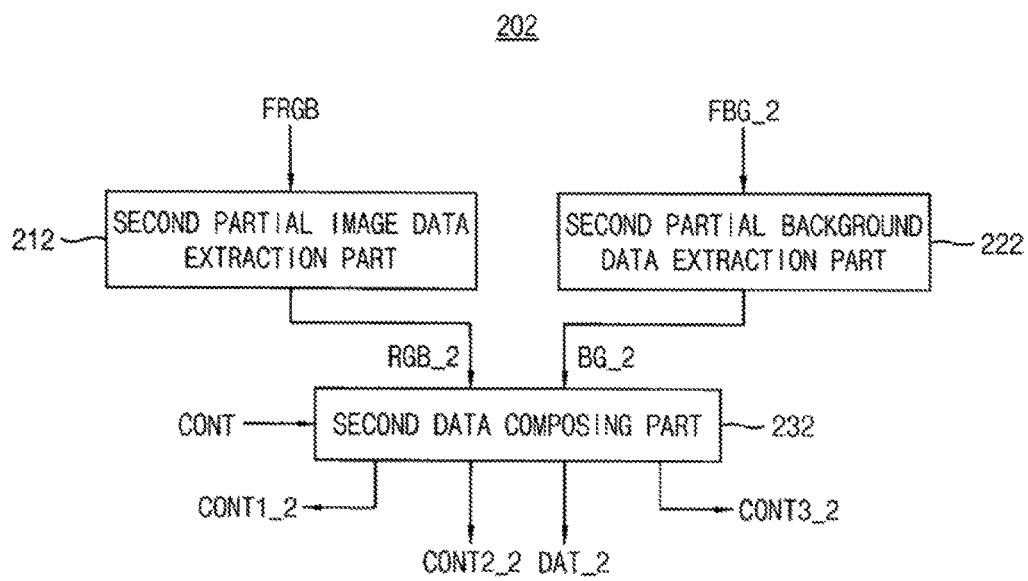
FIG. 9B is a block diagram illustrating a second timing controller included in the display apparatus of FIG. 8B according to an exemplary embodiment of the present inventive concept.

FIG. 9A is a block diagram illustrating a first timing controller 201 included in the display apparatus 20 of FIG. 8B according to an exemplary embodiment of the present inventive concept. FIG. 9B is a block diagram illustrating a second timing controller 202 included in the display apparatus 20 of FIG. 8B according to an exemplary embodiment of the present inventive concept.

Referring to FIGS. 8B, 9A and 9B, the first display panel 101 includes a first area R1 and a second area R2 different from the first area R1. The plurality of first pixels includes a first group of pixels disposed on the first area R1 and a second group of pixels disposed on the second area R2.

The first timing controller 201 includes a first partial image data extraction part 211, a first partial background image data extraction part 221 and a first data composing part 231.

The first partial image data extraction part 211 receives the input image data FRGB from the external device. The first partial image data extraction part 211 generates the first partial image data RGB_1 based on the input image data FRGB. The first partial image data RGB_1 corresponds to the first area R1 of the first display panel 101 out of the input image data FRGB. The first partial image data extraction part 211 outputs the first partial image data RGB_1 to the first data composing part 231.

The first partial background image data extraction part 221 receives the first background image data FBG_1 from the first image sensor 301. The first partial background image data extraction part 221 generates the first partial background image data BG_1 based on the first background image data FBG_1. The first partial background image data BG_1 corresponds to the second area R2 of the first display panel 101 out of the first background image data FBG_1. The first partial background image data extraction part 221 outputs the first partial background image data BG_1 to the first data composing part 231.

The first data composing part 231 receives the input control signal CONT from the external device. The first data composing part 231 receives the first partial image data RGB_1 from the first partial image data extraction part 211. The first data composing part 231 receives the first partial background image data BG_1 from the first partial background image data extraction part 221.

The first data composing part 231 generates the first front control signal CONT1_1, which controls operations of the first gate driver 401, based on the input control signal CONT, and outputs the first front control signal CONT1_1 to the first gate driver 401. The first data composing part 231 generates the second front control signal CONT2_1, which controls operations of the first data driver 601, based on the input control signal CONT, and outputs the second front control signal CONT2_1 to the first data driver 601. The first data composing part 231 generates the first data signal DAT_1 based on the first partial image data RGB_1 and the first partial background image data BG_1. The first data signal DAT_1 may be a data signal corresponding to the composite image of the first partial image data RGB_1 and the first partial background image data BG_1. The first data composing part 231 outputs the first data signal DAT_1 to the first data driver 601. The first data composing part 231 generates the third front control signal CONT3_1, which controls operations of the first gamma reference voltage generator 501, based on the input control signal CONT, and outputs the third front control signal CONT3_1 to the first gamma reference voltage generator 501.

The first data driver 601 receives the second front control signal CONT2_1 and the first data signal DAT_1 from the first data composing part 231. The first data driver 601 outputs data voltages corresponding to the first partial image data RGB_1 to the first group of pixels. The first data driver 601 outputs data voltages corresponding to the first partial background image data BG_1 to the second group of pixels.

Referring to FIG. 9B, the second display panel 102 includes a third area R3 and a fourth area R4 different from the third area R3. The plurality of second pixels includes a third group of pixels disposed on the third area R3 and a fourth group of pixels disposed on the fourth area R4.

The second timing controller 202 includes a second partial image data extraction part 212, a second partial background image data extraction part 222 and a second data composing part 232.

The second partial image data extraction part 212 receives the input image data FRGB from the external device. The second partial image data extraction part 212 generates the second partial image data RGB_2 based on the input image data FRGB. The second partial image data RGB_2 corresponds to the third area R3 out of the input image data FRGB. The second partial image data extraction part 212 outputs the second partial image data RGB_2 to the second data composing part 232.

The second partial background image data extraction part 222 receives the second background image data FBG_2 from the second image sensor 302. The second partial background image data extraction part 222 generates the second partial background image data BG_2 based on the second background image data FBG_2. The second partial background image data BG_2 corresponds to the fourth area R4 out of the second background image data FBG_2. The second partial background image data extraction part 222 outputs the second partial background image data BG_2 to the second data composing part 232.

The second data composing part 232 receives the input control signal CONT from the external device. The second data composing part 232 receives the second partial image data RGB_2 from the second partial image data extraction part 212. The second data composing part 232 receives the second partial background image data BG_2 from the second partial background image data extraction part 222.

The second data composing part 232 generates the first rear control signal CONT1_2, which controls operations of the second gate driver 402, based on the input control signal CONT, and outputs the first rear control signal CONT1_2 to the second gate driver 402. The second data composing part 232 generates the second rear control signal CONT2_2, which controls operations of the second data driver 602, based on the input control signal CONT, and outputs the second rear control signal CONT2_2 to the second data driver 602. The second data composing part 232 generates the second data signal DAT_2 based on the second partial image data RGB_2 and the second partial background image data BG_2. The second data signal DAT_2 may be a data signal corresponding to the composite image of the second partial image data RGB_2 and the second partial background image data BG_2. The second data composing part 232 outputs the second data signal DAT_2 to the second data driver 602. The second data composing part 232 generates the third rear control signal CONT3_2, which controls operations of the second gamma reference voltage generator 502, based on the input control signal CONT, and outputs the third rear control signal CONT3_2 to the second gamma reference voltage generator 502.

The second data driver 602 receives the second rear control signal CONT2_2 and the second data signal DAT_2 from the second data composing part 232. The second data driver 602 outputs data voltages corresponding to the second partial image data RGB_2 to the third group of pixels. The second data driver 602 outputs data voltages corresponding to the second partial background image data BG_2 to the fourth group of pixels.

In an exemplary embodiment of the present inventive concept, the first display panel 101 may be disposed in substantially the same configuration as those described with reference to FIGS. 3A-3C.

In an exemplary embodiment of the present inventive concept, the first display panel 101 may be disposed in substantially the same configuration as those described with reference to FIGS. 4A-4C.

In an exemplary embodiment of the present inventive concept, the first display panel 101 may be disposed in substantially the same configuration as those described with reference to FIGS. 5A-5C.

In an exemplary embodiment of the present inventive concept, the first display panel 101 may be disposed in substantially the same configuration as those described with reference to FIGS. 6A-6C.

In an exemplary embodiment of the present inventive concept, the second display panel 102 may be disposed in substantially the same configuration as those described with reference to FIGS. 3A-3C. Here, the third area R3 and the fourth area R4 of the second display panel 102 may be considered to correspond to the first area R1 and the second area R2, respectively, of FIGS. 3A-3C.

In an exemplary embodiment of the present inventive concept, the first display panel 101 may be disposed in substantially the same configuration as those described with reference to FIGS. 4A-4C. Here, the third area R3 and the fourth area R4 of the second display panel 102 may be considered to correspond to the first area R1 and the second area R2, respectively, of FIGS. 4A-4C.

In an exemplary embodiment of the present inventive concept, the first display panel 101 may be disposed in substantially the same configuration as those described with reference to FIGS. 5A-5C. Here, the third area R3 and the fourth area R4 of the second display panel 102 may be considered to correspond to the first area R1 and the second area R2, respectively, of FIGS. 5A-5C.

In an exemplary embodiment of the present inventive concept, the first display panel 101 may be disposed in substantially the same configuration as those described with reference to FIGS. 6A-6C. Here, the third area R3 and the fourth area R4 of the second display panel 102 may be considered to correspond to the first area R1 and the second area R2, respectively, of FIGS. 6A-6C.

Figure 10:
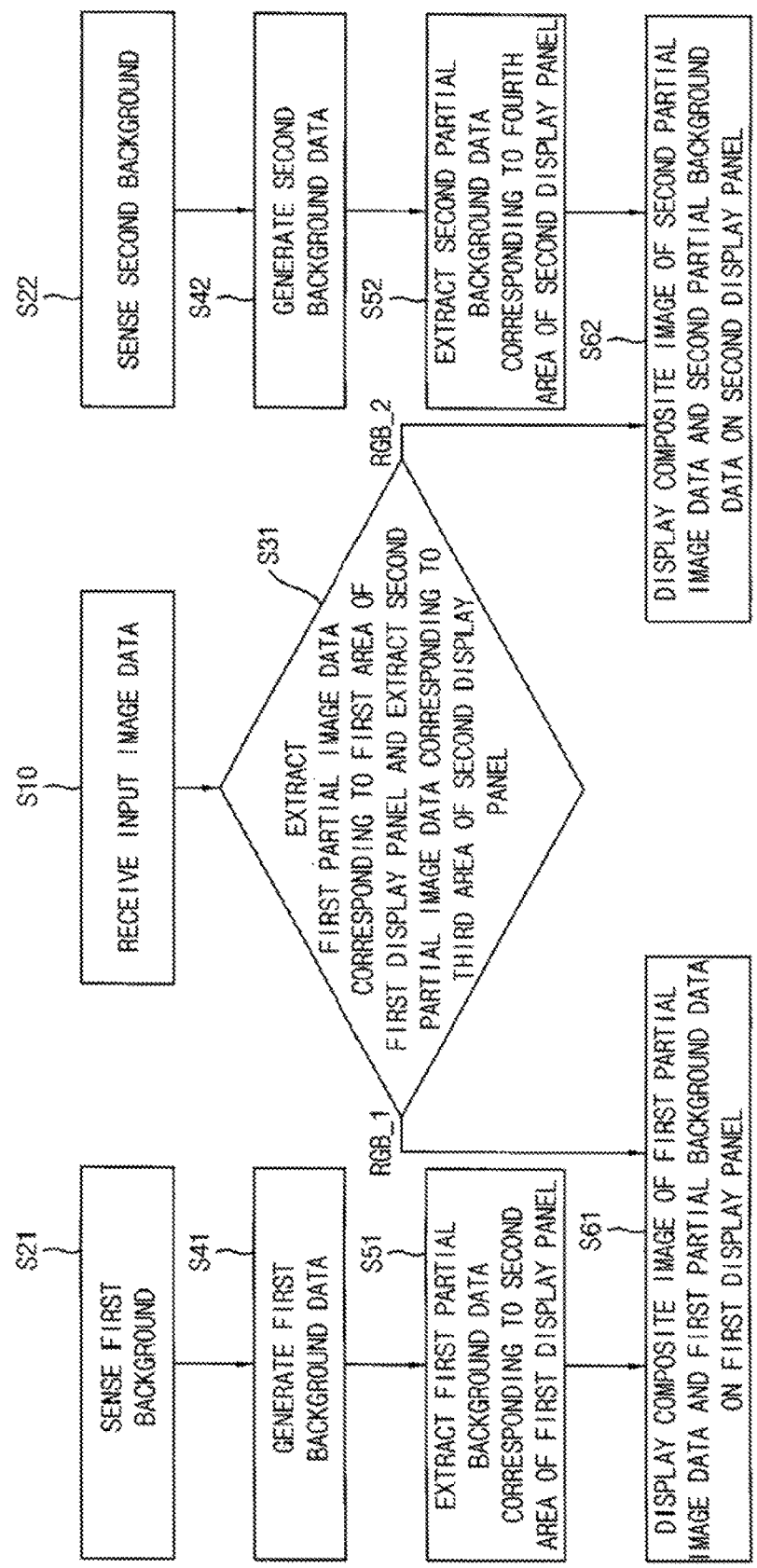
FIG. 10 is a flow chart illustrating a method of driving a display apparatus according to an exemplary embodiment of the present inventive concept.

FIG. 10 is a flow chart illustrating a method of driving a display apparatus according to an exemplary embodiment of the present inventive concept.

Referring to FIGS. 8B, 9A, 9B and 10, the first and second partial image data extraction parts 211 and 212 receive the input image data FRGB from the external device (S10). The first partial image data extraction part 211 extracts the first partial image data RGB_1 corresponding to the first area R1 of the first display panel 101 from the input image data FRGB, and the second partial image data extraction part 212 extracts the second partial image data RGB_2 corresponding to the third area R3 of the second display panel 102 from the input image data FRGB (S31).

The first image sensor 301 senses the first background image (S21). The first image sensor 301 generates the first background image data FBG_1 based on the first background image (S41). The first partial background image data extraction part 211 extracts the first partial background image data BG_1 corresponding to the second area R2 of the first display panel 101 from the first background image data FBG_1 (S51).

The second image sensor 302 senses the second background image (S22). The second image sensor 302 generates the second background image data FBG_2 based on the second background image (S42). The second partial background image data extraction part 212 extracts the second partial background image data BG_2 corresponding to the fourth area R4 of the second display panel 102 from the second background image data FBG_2 (S52).

The first composite image of the first partial image data RGB_1 and the first partial background image data BG_1 is displayed on the first display panel 101 (S61). The second composite image of the second partial image data RGB_2 and the second partial background image data BG_2 is displayed on the second display panel (S62).

Figure 11A:
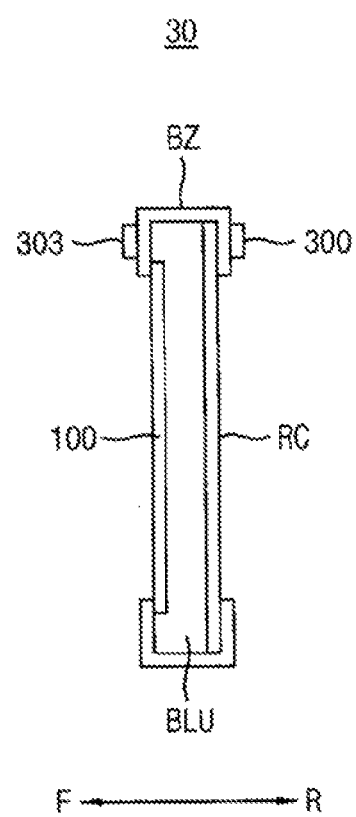
FIG. 11A is a cross-sectional diagram illustrating a side view of a display apparatus according to an exemplary embodiment of the present inventive concept.
Figure 11B:
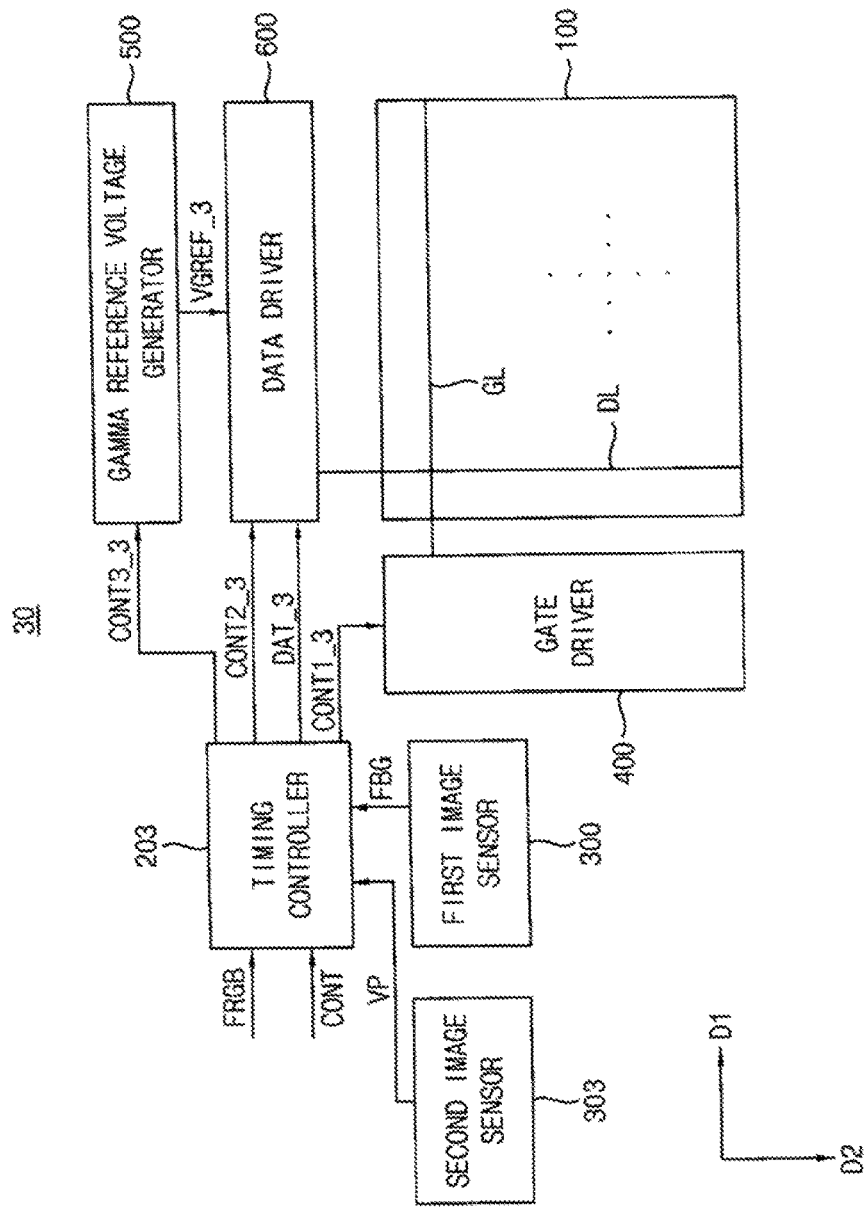
FIG. 11B is a block diagram illustrating the display apparatus of FIG. 11A according to an exemplary embodiment of the present inventive concept.
Figure 12:
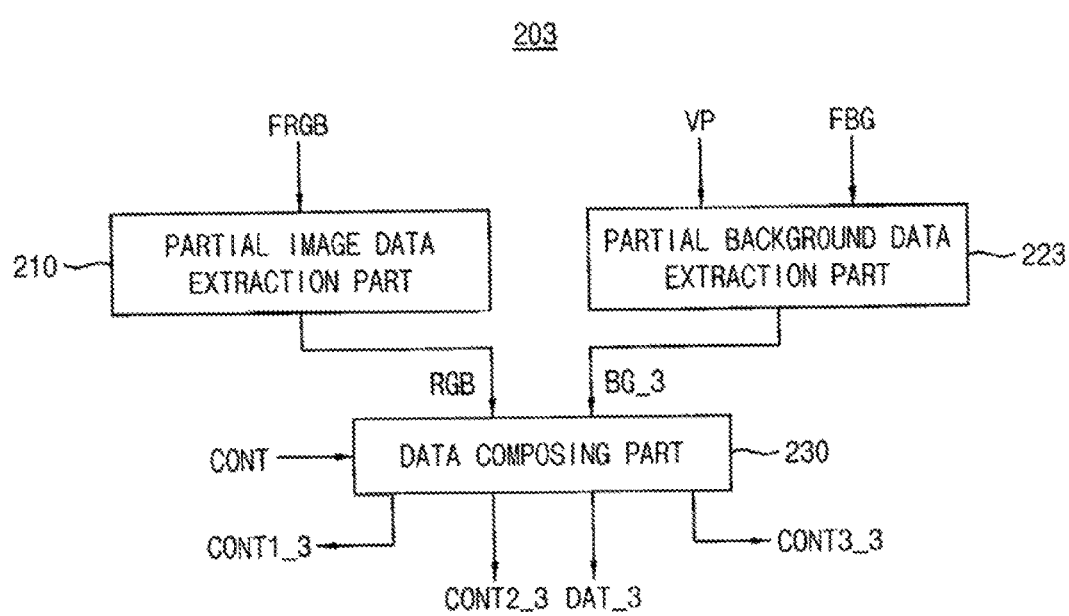
FIG. 12 is a block diagram illustrating a third timing controller included in the display apparatus of FIG. 11B according to an exemplary embodiment of the present inventive concept.

FIG. 11A is a cross-sectional diagram illustrating a side view of a display apparatus 30 according to an exemplary embodiment of the present inventive concept. FIG. 11B is a block diagram illustrating the display apparatus 30 of FIG. 11A according to an exemplary embodiment of the present inventive concept. FIG. 12 is a block diagram illustrating a third timing controller 203 included in the display apparatus 30 of FIG. 11B according to an exemplary embodiment of the present inventive concept.

Hereinafter, repetitive description of the same elements as those of FIGS. 1A, 1B and 2 will be omitted.

Referring to FIGS. 11A, 11B and 12, the display apparatus 30 includes a display panel 100, a panel driver, a backlight unit BLU, a rear cover RC, a bezel BZ, a first image sensor 300 and a second image sensor 303. For example, the display apparatus 30 of FIG. 11A may have substantially the same configuration as the display apparatus 10 of FIG. 1A except for the second image sensor 303.

The first image sensor 300 senses a background image around the display apparatus 30. The first image sensor 300 may be mounted on a second surface of the display apparatus 30 opposite to a first surface of the display apparatus 30. The first image sensor 300 may be mounted on the bezel BZ. The first image sensor 300 may sense a background image of a rear side R of the display apparatus 30.

The second image sensor 303 may be mounted on the first surface of the display apparatus 30. The second image sensor 303 may be mounted on the bezel BZ. The second image sensor 303 may detect (e.g., sense) an image corresponding to a viewpoint of a viewer (e.g., a user).

Referring to FIG. 11B, the panel driver includes a timing controller 203, a gate driver 400, a gamma reference voltage generator 500 and a data driver 600.

The first image sensor 300 senses a background image around the display apparatus 30. The background image may be a background image of a rear side R of the display apparatus 30. The first image sensor 300 generates background image data FBG based on the background. The first image sensor 300 outputs the background image data FBG to the timing controller 203. For example, the first image sensor 300 may include a CMOS image sensor or a CCD image sensor.

The second image sensor 303 outputs viewpoint image data VP to the timing controller 203.

Referring to FIG. 12, the timing controller 203 includes a partial image data extraction part 210, a partial background image data extraction part 223 and a data composing part 230.

The partial background image data extraction part 223 receives the viewpoint image data VP from the second image sensor 303 and the background image data FBG from the first image sensor 300. The partial background image data extraction part 223 generates partial background image data BG_3 based on the viewpoint image data VP and the background image data FBG. The partial background image data BG_3 corresponds to the viewpoint VP.

In an exemplary embodiment of the present inventive concept, the display panel 100 of FIG. 11B may be disposed in substantially the same configurations as those described with reference to FIGS. 3A-3C.

In an exemplary embodiment of the present inventive concept, the display panel 100 of FIG. 11B may be disposed in substantially the same configurations as those described with reference to FIGS. 4A-4C.

In an exemplary embodiment of the present inventive concept, the display panel 100 of FIG. 11B may be disposed in substantially the same configurations as those described with reference to FIGS. 5A-5C.

In an exemplary embodiment of the present inventive concept, the display panel 100 of FIG. 11B may be disposed in substantially the same configurations as those described with reference to FIGS. 6A-6C.

The exemplary embodiments of the present inventive concept may be used in a display apparatus and/or a system including the display apparatus, such as a mobile phone, a smart phone, a personal digital assistant (PDA), a portable media player (PMP), a digital camera, a digital television, a set-top box, a music player, a portable game console, a navigation device, a personal computer (PC), a server computer, a workstation, a tablet computer, a laptop computer, a smart card, a printer, etc.

The foregoing is illustrative of exemplary embodiments of the present inventive concept and the present inventive concept should not be construed as being limiting to the exemplary embodiments disclosed therein. Although a few exemplary embodiments of the present inventive concept have been described, it will be understood that various modifications in forms and detail may be made therein without departing from the spirit and scope of the present inventive concept.

What is claimed is:

1. A display apparatus comprising:
 a first image sensor configured to generate first background image data by capturing a first background image of a rear side of the display apparatus;

a first display panel comprising a plurality of first pixels arranged in a first matrix, the plurality of first pixels including a first group of pixels disposed on a first area of the first display panel and a second group of pixels disposed on a second area of the first display panel;

a first timing controller configured to extract first partial image data corresponding to the first area from input image data received from an external device, and to extract first partial background image data corresponding to the second area from the first background image data; and a data driver configured to generate first data voltages based on the first partial image data, to generate second data voltages based on the first partial background image data, to output the first data voltages to the first group of pixels, and to output the second data voltages to the second group of pixels such that the first display panel displays a composite image of the first partial image data and the first partial background image data.

2. The display apparatus of claim 1,
wherein the first display panel is disposed on a first surface of the display apparatus, and
wherein the first image sensor is mounted on a second surface of the display apparatus opposite to the first surface of the display apparatus.

3. The display apparatus of claim 1, wherein
each of the first group of pixels is disposed in one of a first group of columns of the first matrix, and each of the second group of pixels is disposed in one of a second group of columns,
wherein the first group of columns and the second group of columns are alternately arranged.

4. The display apparatus of claim 1, wherein
each of the first group of pixels is disposed in one of a first group of rows of the first matrix, and each of the second group of pixels is disposed in one of a second group of rows,
wherein the first group of rows and the second group of rows are alternately arranged.

5. The display apparatus of claim 1, wherein
a resolution of the input image data is higher than a resolution of the first background image data, and
a number of pixels of the first group of pixels is greater than a number of pixels of the second group of pixels.

6. The display apparatus of claim 5, wherein
the resolution of the input image data is n times higher than the resolution of the first background image data, where n is a natural number equal to or greater than two, and
the number of the pixels of the first group of pixels is m times greater than the number of the pixels of the second group of pixels, where m is a natural number smaller than n.

7. The display apparatus of claim 5, wherein
a first pixel, a second pixel, a third pixel, and a fourth pixel are arranged in an i×j matrix of the first matrix (i and j are natural numbers greater than one), and
the first group of pixels comprises the first pixel, the second pixel, and the third pixel, and the second group of pixels comprises the fourth pixel.

8. The display apparatus of claim 1, wherein
a resolution of the input image data is higher than a resolution of the first background image data, and
a number of pixels of the first group of pixels is substantially the same as a number of pixels of the second group of pixels.

9. The display apparatus of claim 1, wherein the first image sensor is a complementary metal-oxide-semiconductor (CMOS) image sensor or a charge-coupled device (CCD) image sensor.

10. A method of driving a display apparatus comprising a first display panel, the method comprising:
receiving input image data from an external device;
generating first background image data by capturing a first background image of a rear side of the display apparatus;
extracting first partial image data from the input image data, the first partial image data corresponding to a first area of the first display panel;
extracting first partial background image data from the first background image data, the first partial background image data corresponding to a second area of the first display panel;
generating first data voltages based on the first partial image data;
outputting the first data voltages to a first group of pixels of the first display panel, the first group of pixels being disposed on the first area;
generating second data voltages based on the first partial background image data; and
outputting the second data voltages to a second group of pixels of the first display panel, the second group of pixels being disposed on the second area such that the first display panel displays a composite image of the first partial image data and the first partial background image data.

11. The method of claim 10, wherein
the first display panel is configured to display a first image, and
wherein the first image sensor is mounted on a second surface of the display apparatus opposite to the first surface of the display apparatus.

12. The method of claim 10, wherein
the first group of pixels and the second group of pixels are arranged in a matrix, and
wherein each of the first group of pixels is disposed in one of a first group of columns of the matrix, and each of the second group of pixels is disposed in one of a second group of columns of the matrix,
wherein the first group of columns and the second group of columns are alternately arranged.

13. The method of claim 10, wherein
the first group of pixels and the second group of pixels are arranged in a matrix, and
wherein each of the first group of pixels is disposed in one of a first group of rows of the matrix, and each of the second group of pixels is disposed in one of a second group of rows,
wherein the first group of rows and the second group of rows are alternately arranged.

14. The method of claim 10, wherein
a resolution of the input image data is higher than a resolution of the first background image data, and
a number of pixels of the first group of pixels is greater than a number of pixels of the second group of pixels.

15. The method of claim 10, wherein the first image sensor is a complementary metal-oxide-semiconductor (CMOS) image sensor or a charge-coupled device (CCD) image sensor.

16. The method of claim 10, wherein:
a resolution of the input image data is n times higher than a resolution of the first background image data, where n is a natural number equal to or greater than two; and a number of the pixels of the first group of pixels is m times greater than a number of the pixels of the second group of pixels, where m is a natural number smaller than n.

17. The method of claim 10, wherein:

a resolution of the input image data is higher than a resolution of the first background image data;

a number of pixels of the first group of pixels is greater than a number of pixels of the second group of pixels;

a first pixel, a second pixel, a third pixel, and a fourth pixel are arranged in an i×j matrix of the first matrix (i and j are natural numbers greater than one); and the first group of pixels comprises the first pixel, the second pixel, and the third pixel, and the second group of pixels comprises the fourth pixel.

* * * * *